United States Patent
Nagamine et al.

(10) Patent No.: US 6,564,070 B1
(45) Date of Patent: *May 13, 2003

(54) IMAGE INPUT APPARATUS SUCH AS DIGITAL CORDLESS TELEPHONE HAVING RADIO COMMUNICATION FUNCTION FOR COMMUNICATING WITH BASE STATION

(75) Inventors: Kazuhide Nagamine, Kawasaki (JP); Hiraku Sonobe, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/934,802

(22) Filed: Sep. 22, 1997

(30) Foreign Application Priority Data

Sep. 25, 1996 (JP) .............................................. 8-252954
Aug. 29, 1997 (JP) .............................................. 9-234045

(51) Int. Cl.⁷ .............................. H04B 1/38; H04M 1/00
(52) U.S. Cl. ........................ 455/556; 455/566; 455/414; 455/344; 348/14.02
(58) Field of Search ................................. 455/566, 567, 455/419, 420, 456, 457, 466, 414, 418, 426, 90, 550, 556, 557; 370/493, 494, 495; 348/14

(56) References Cited

U.S. PATENT DOCUMENTS

| | | | | |
|---|---|---|---|---|
| 5,267,042 A | | 11/1993 | Tsuchiya et al. ............. 348/239 |
| 5,296,884 A | | 3/1994 | Honda et al. ................ 396/311 |
| 5,335,072 A | * | 8/1994 | Tanaka et al. .............. 348/232 |
| 5,470,233 A | * | 11/1995 | Fruchterman et al. ....... 434/112 |
| 5,479,485 A | * | 12/1995 | Hayashi ....................... 455/462 |
| 5,485,504 A | * | 1/1996 | Ohnsorge .................... 455/566 |
| 5,491,507 A | * | 2/1996 | Umezawa et al. ............ 348/14 |
| 5,548,822 A | * | 8/1996 | Yogo ............................ 455/68 |
| 5,590,092 A | * | 12/1996 | Fehnel ......................... 368/10 |
| 5,613,202 A | * | 3/1997 | Ishida ........................ 455/33.1 |
| 5,711,012 A | * | 1/1998 | Bottoms et al. ............. 455/557 |
| 5,727,057 A | * | 3/1998 | Emery et al. ................ 379/211 |
| 5,761,283 A | * | 6/1998 | Chung ................... 379/100.06 |
| 5,806,005 A | * | 9/1998 | Hull et al. ................... 455/566 |
| 5,825,408 A | * | 10/1998 | Yuyama ........................ 348/14 |
| 5,873,041 A | * | 2/1999 | Ishii ............................ 455/457 |
| 5,893,037 A | * | 4/1999 | Reele et al. ................. 455/556 |
| 5,901,358 A | * | 5/1999 | Petty et al. ................. 455/456 |
| 5,974,330 A | * | 10/1999 | Negishi ....................... 455/457 |
| 6,014,170 A | * | 1/2000 | Pont et al. .................. 348/232 |
| 6,035,022 A | * | 3/2000 | Kim ....................... 379/100.01 |
| 6,122,521 A | * | 9/2000 | Wilkinson et al. .......... 455/457 |
| 6,122,526 A | * | 9/2000 | Parulski et al. ............. 455/556 |
| 6,169,575 B1 | * | 1/2001 | Anderson et al. ........... 348/231 |

FOREIGN PATENT DOCUMENTS

| | | | |
|---|---|---|---|
| EP | 0 650 125 | 4/1995 | |
| JP | 09 065268 | 7/1997 | |
| JP | 10-094030 A | 4/1998 | ............ H04Q/7/34 |

OTHER PUBLICATIONS

European Search Report (Mar. 17, 2000).

* cited by examiner

*Primary Examiner*—Edward F. Urban
*Assistant Examiner*—Charles Craver
(74) *Attorney, Agent, or Firm*—Morgan & Finnegan, LLP

(57) ABSTRACT

The identification information of a base station used to identify this station is stored in relation to position information. If received identification information is stored when an image is photographed, position information corresponding to the stored identification information is added to the image data.

26 Claims, 23 Drawing Sheets

FIG. 2

| R | SS | PR | UW | CI | CS-ID | I |
|---|---|---|---|---|---|---|
| 4 BITS | 2 BITS | 62 BITS | 32 BITS | 4 BITS | 42 BITS | 62 BITS |

FIG. 3

| | OUTDOOR PUBLIC TELEPHONE ADDITIONAL ID 33 BITS | |
|---|---|---|
| PROVIDER IDENTIFICATION CODE 9 BITS | GENERAL CALLING AREA NUMBER n BITS | ADDITIONAL ID 33-n BITS |

FIG. 4

| No. | BASE STATION IDENTIFICATION CODE | POSITION INFORMATION |
|---|---|---|
| 1 | 0000 01000 | SHIMOMARUKO STORE |
| 2 | 001F 11000 | KAMATA STORE |
| 3 | 1111 01786 | MEGURO STORE |

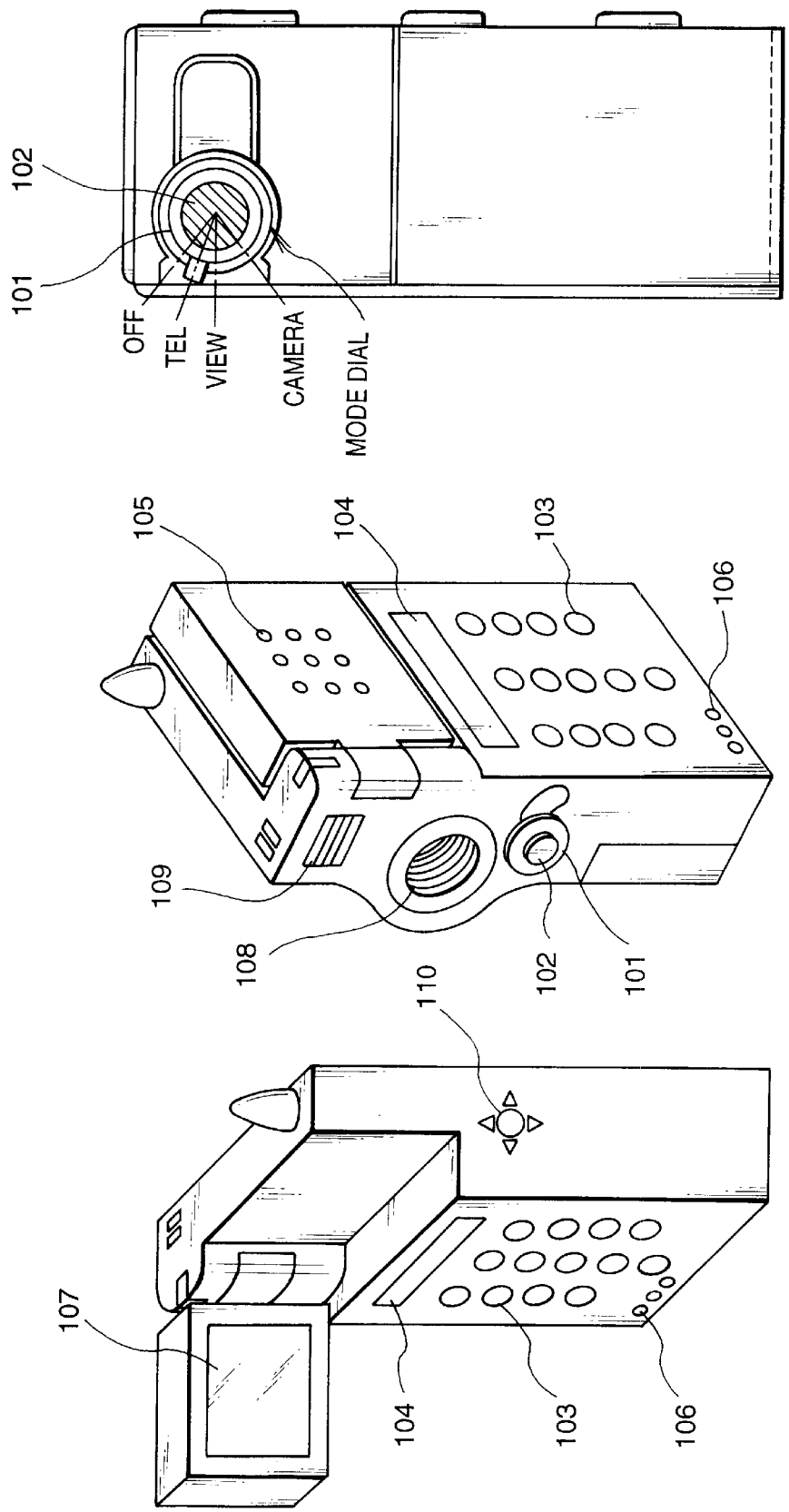

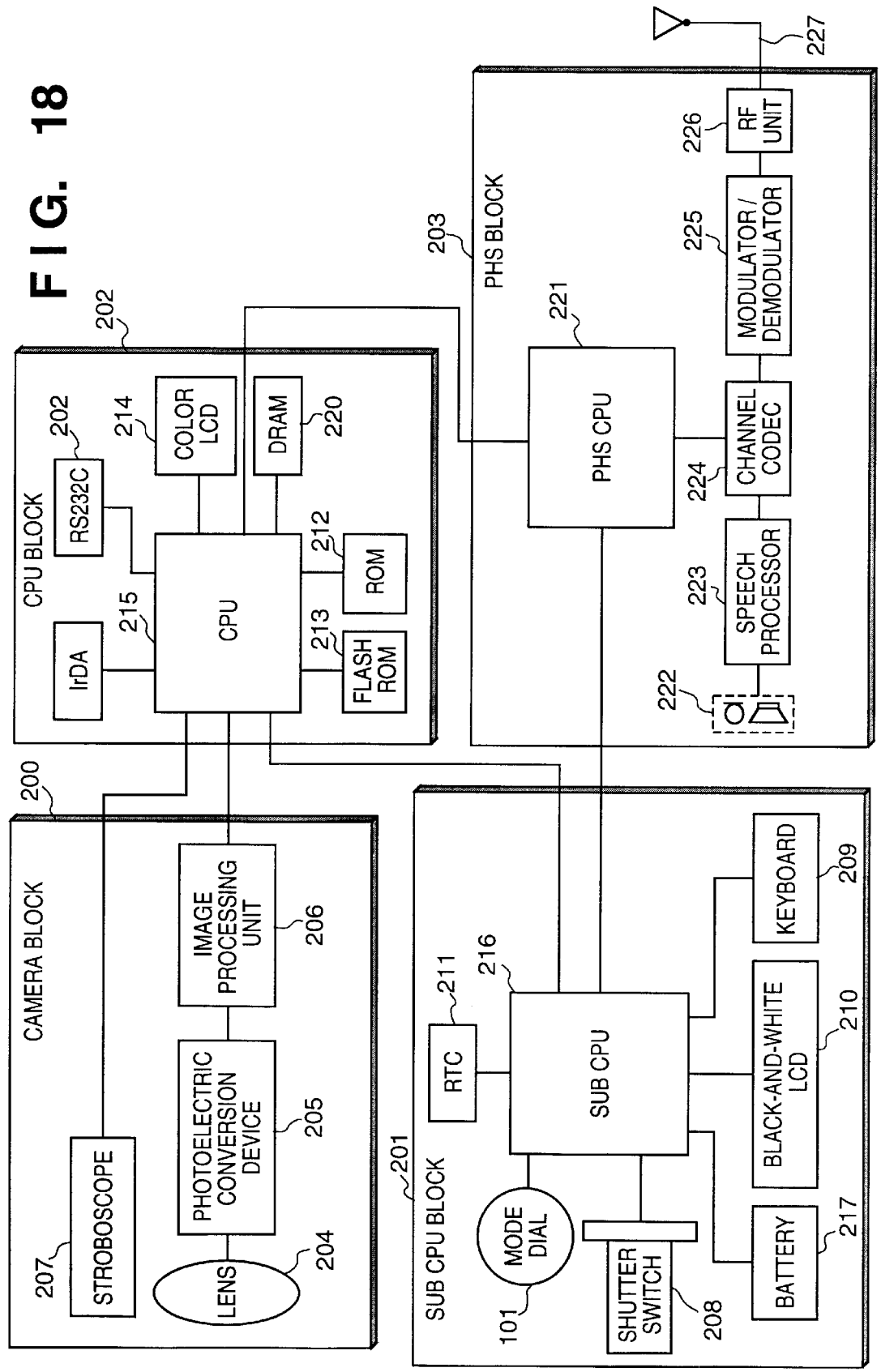

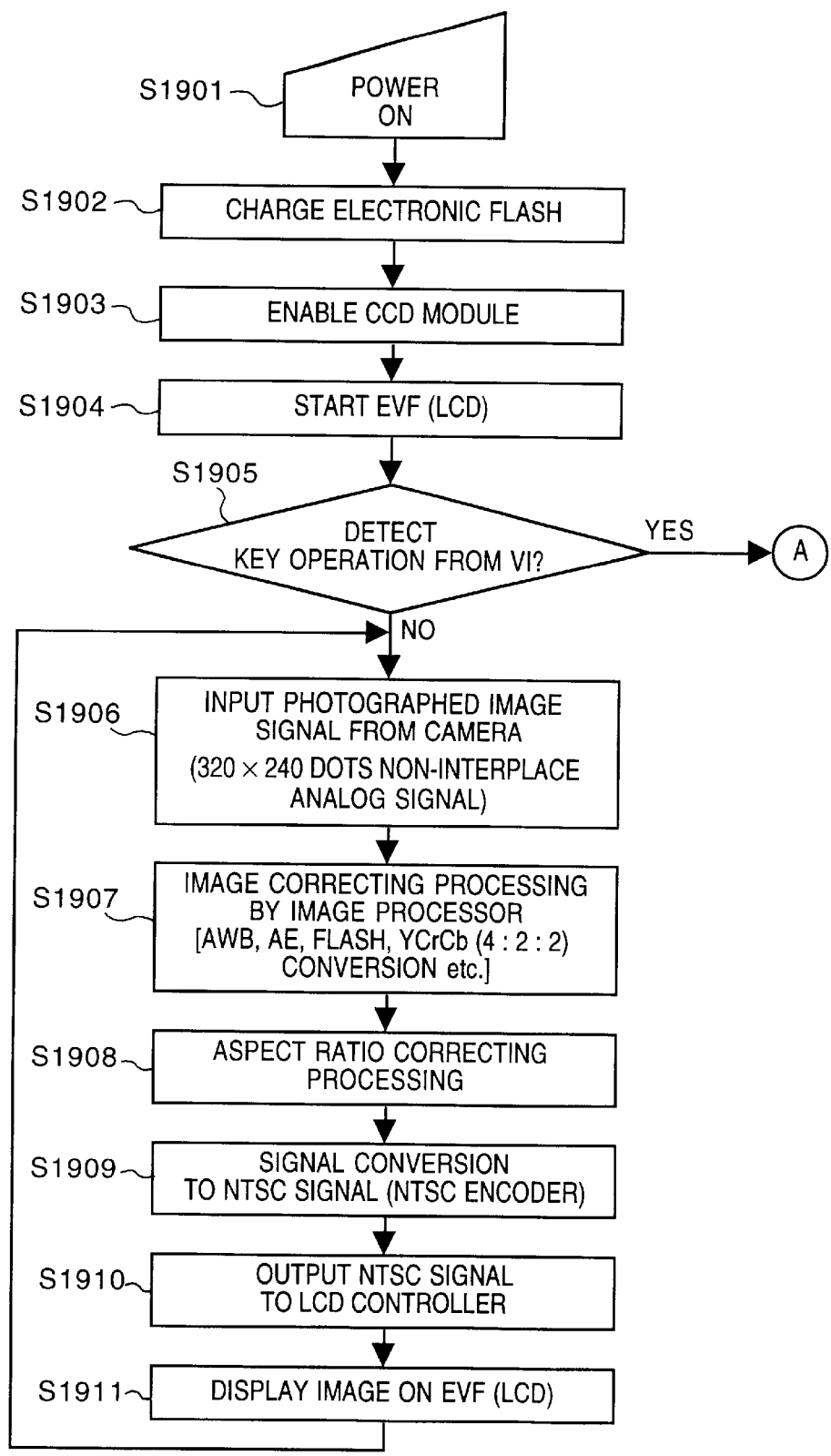

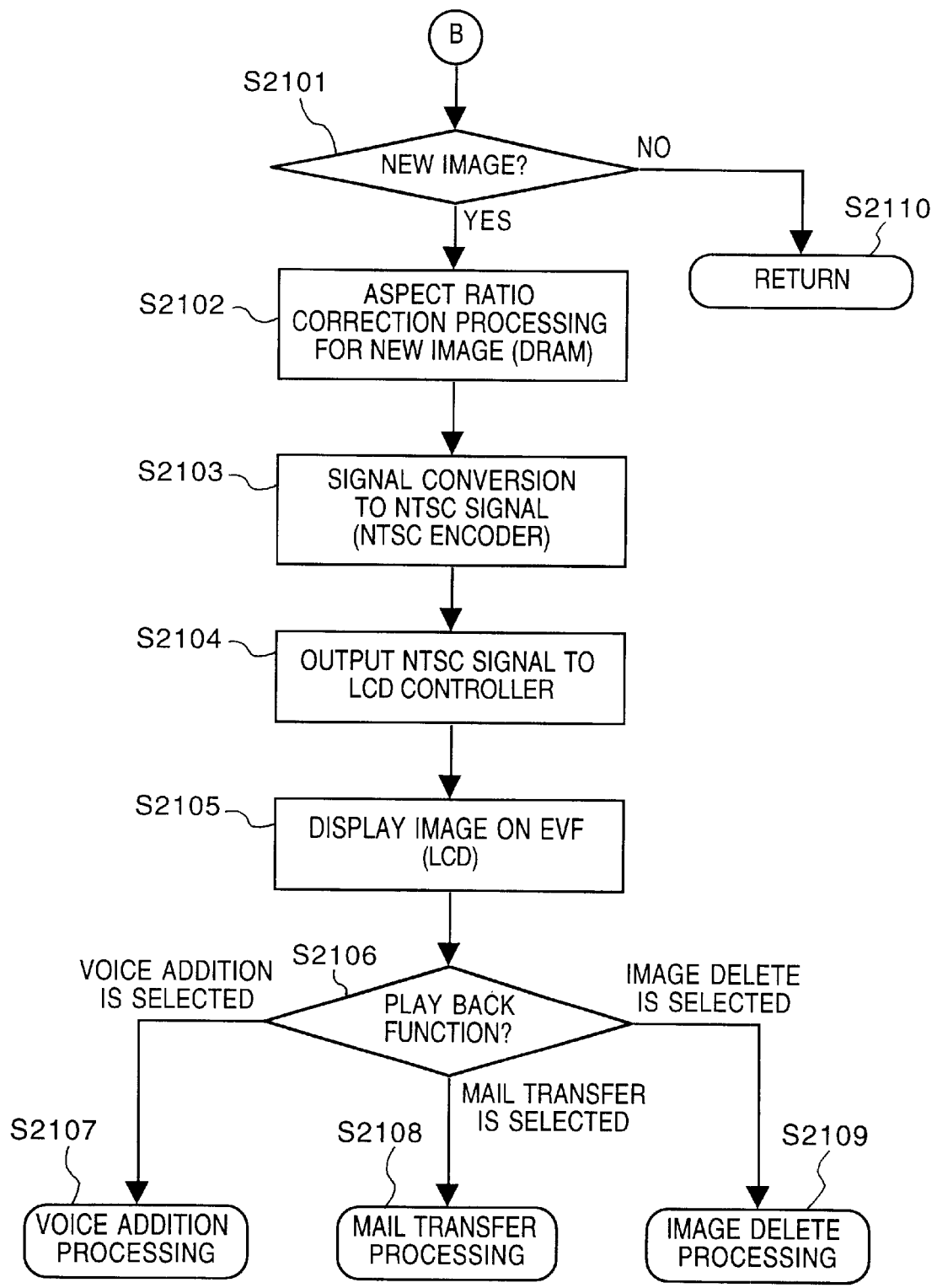

FIG. 24

| | IMAGE FILE NAME | IMAGE DATA STORAGE ADDRESSES | IMAGE PROPERTY STORAGE ADDRESSES |
|---|---|---|---|
| 1 | MA-0001 | FX00~FX50 | XX00~XX06 |
| 2 | MA-0002 | FX51~FXA0 | XX07~XX0B |
| 3 | MA-0003 | FXA1~FXF0 | XX0C~XX11 |

IMAGE INPUT APPARATUS SUCH AS DIGITAL CORDLESS TELEPHONE HAVING RADIO COMMUNICATION FUNCTION FOR COMMUNICATING WITH BASE STATION

BACKGROUND OF THE INVENTION

1. Field of the Invention

The present invention relates to an image input apparatus such as a digital cordless telephone having a radio communication function for communicating with a base station or cell site.

2. Description of the Related Art

Conventionally, when a user wants to record information such as a photographing location in an image photographed by an image input apparatus such as a camera or a video camera, he or she manually inputs the information when photographing the image.

It is also possible to photograph an image by using an apparatus such as a digital still camera and supply the photographed image to a computer such as a personal computer. If this is the case, the image is edited on the computer to insert information such as a photographing location input by, e.g., a keyboard into the image.

A telephone for performing telephone conversation and an image input apparatus such as a camera or a video camera are separate apparatuses.

In the above related art, however, each time an image is photographed information such as a photographing location is manually input to the image directly or after the image is supplied to a computer. This is a very cumbersome operation.

Also, since a manual input operation is performed each time an image is photographed, input errors occur frequently.

Furthermore, to exchange photographed images, it is necessary to directly deliver a film or the like by hand to the other party. This is also very troublesome.

Additionally, a telephone set and an image input apparatus are separate apparatuses. Therefore, to input an image while talking to the other party over the phone, a user must operate the telephone set and the image input apparatus, i.e., must perform a very tedious operation.

SUMMARY OF THE INVENTION

It is an object of the present invention to easily add position information obtained on the basis of identification information of a base station to a photographed image as photographing position information.

It is another object of the present invention to eliminate errors when position information obtained on the basis of identification information of a base station is added to a photographed image as photographing position information.

It is still another object of the present invention to communicate by radio an image to which position information obtained on the basis of identification information of a base station is added as photographing position information.

It is still another object of the present invention to perform voice communication and image input with a single apparatus.

It is still another object of the present invention to store position information obtained on the basis of identification information of a base station as photographing position information which is a part of attribute information of a photographed image.

It is still another object of the present invention to communicate photographing position information of a photographed image as its attribute information when communicating the photographed image.

It is still another object of the present invention to store photographing position information of an image without using any special image file format.

It is still another object of the present invention to reduce position information stored together with an image.

It is still another object of the present invention to add position information obtained from a base station to a moving image or a motion picture.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 is a view of the frame format of a common control signal transmitted by a base station used in the system of the first embodiment of the present invention;

FIG. 3 is a view showing a base station identification code of a base station used in the system of the first embodiment of the present invention;

FIG. 4 is a view showing an example of stored position information of the image input apparatus according to the first embodiment of the present invention;

FIG. 15 is a view showing the outer appearance of the image input apparatus according to the fourth embodiment of the present invention;

FIG. 16 is a view showing the outer appearance of the image input apparatus according to the fourth embodiment of the present invention;

FIG. 17 is a view showing the outer appearance of the image input apparatus according to the fourth embodiment of the present invention;

FIG. 18 is a block diagram of the image input apparatus according to the fourth embodiment of the present invention;

FIG. 19 is a flow chart showing the control procedure of a camera photographing operation in the fourth embodiment of the present invention;

FIG. 21 is a flow chart showing the control procedure of playback processing in the fourth embodiment of the present invention;

FIG. 24 is a view of the storage format of image files and position information in the fifth embodiment of the present invention.

DETAILED DESCRIPTION OF THE PREFERRED EMBODIMENTS

First Embodiment

The first embodiment will be described in detail below.

In this embodiment of the present invention, an image input apparatus uses a personal handy phone system (to be referred to as a PHS hereinafter) as a radio communication medium as one example of digital cordless telephones.

Although the following description will be made by taking a PHS as an example, the present invention can be similarly practiced by using other digital cordless telephones such as CT-2, CT-3, DECT (Digital European Cordless Telephone), and UDPC (Universal Digital Portable Communications).

Figure 1:
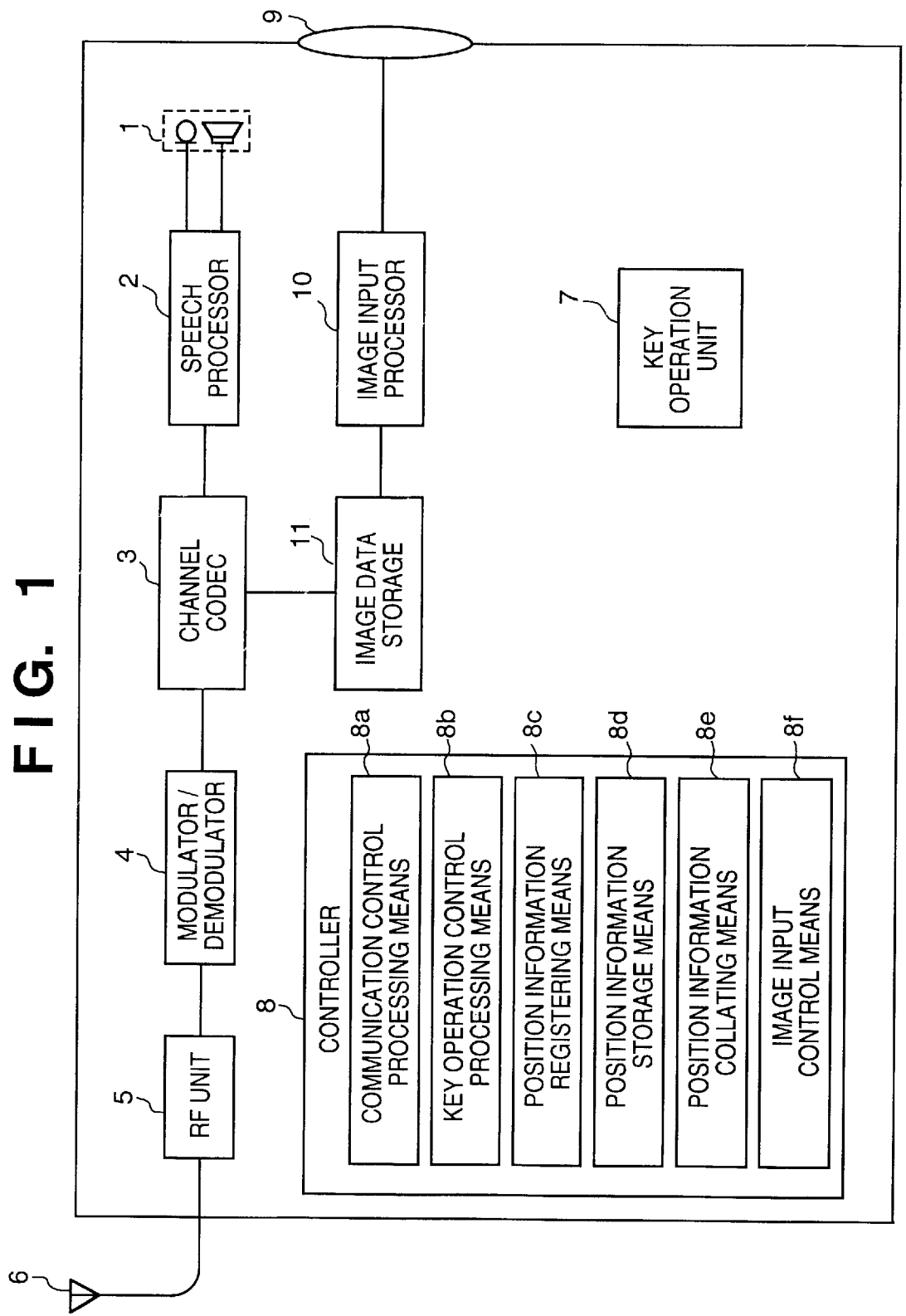
FIG. 1 is a block diagram of an image input apparatus according to the first embodiment of the present invention.

FIG. 1 is a block diagram of an image input apparatus for performing radio communication by using a PHS as a radio communication medium as the first embodiment of the present invention.

In FIG. 1, reference numeral 1 denotes a handset; 2, a speech processor for performing compression encoding and expansion decoding for speech data; 3, a channel CODEC for performing TDMA (Time Division Multiple Access) processing such as disassembling/assembling of frames, error correction processing, scrambling processing, and privacy conversation processing for speech data; 4, a modulator/demodulator for modulating transmission data and demodulating received data; 5, an RF unit for transmitting/receiving radio signals; 6, an antenna for transmitting/receiving radio waves; 7, a key operation unit for operating various key inputs; and 8, a controller. The controller 8 includes a communication control processing means 8a, a key operation control processing means 8b, a position information registering means 8c, a position information storage means 8d, a position information collating means 8e; and an image input control means 8f.

The communication control processing means 8a performs communication protocol processing from layers 1 to 3 of a PHS. The key operation control processing means 8b analyzes various key input information from the key operation unit 7 and performs processing.

When position information (e.g., "at Shimomaruko Store") corresponding to a base station identification code (CS-ID) contained in a common control signal (PCH signal) intermittently transmitted from a base station is input from the key operation unit 7 while the image input apparatus is not performing radio communication, the position information registering means 8c registers position information corresponding to the base station identification code, as shown in FIG. 4, in the position information storage means 8d.

The common control signal (PCH, Paging Channel) intermittently transmitted from a base station will be described below.

FIG. 2 is a view showing the frame format of the common control signal (PCH).

As shown in FIG. 2, the common control signal (PCH) is constituted by a ramp bit R, a start symbol SS indicating the start of a frame, a preamble PR for attaining bit synchronization, UW (unique word) for attaining frame synchronization, CI (Channel Identifier) indicating the type of frame, CS-ID (base station identification code), and a control signal I.

If the self-terminal is called, the telephone number (PS number) of the image input apparatus of the self-terminal is written in the control signal I.

Accordingly, in a standby state whether the self-terminal is called is monitored by checking the control signal I. If the telephone number (PS number) of the self-terminal is transmitted, it is determined that the self-terminal is called.

FIG. 3 is a view showing the format of the base station identification code CS-ID. The base station identification code CS-ID has 42 bits and is constituted by a provider identification code and an outdoor public telephone additional ID. The provider identification code identifies a provider providing PHS communication services, in other words, indicates a base station of a provider which has transmitted the common control signal.

The outdoor public telephone additional ID has 33 bits and is constituted by a general calling area number (n bits) indicating an area of a group of a plurality of base stations, and an additional ID (33–n bits).

Information of the bit numbers of the general calling area number and the additional ID is obtained from the first common control signal (BCCH, Broadcast Control Channels) from a base station when the image input apparatus performs position registration for the base station.

Referring to FIG. 4, it is unnecessary to store all bits of the base station identification code. That is, the provider identification code (9 bits) indicates a PHS provider to which the image input apparatus has subscribed. Therefore, only the outdoor public telephone additional ID needs to be stored.

In FIG. 4, the general calling area number has 16 bits, and the additional ID has 17 bits.

Also, each of the general calling area number (16 bits) and the additional ID (17 bits) is stored in the form of a hexadecimal number (hexa form).

The position information collating means 8e collates the base station identification code contained in a common control signal transmitted from a base station with the base station identification code in the position information storage means 8d, and obtains current position information of the image input apparatus.

Also, the image input control means 8f performs various control operations for image input.

Note that the controller 8 includes a processor (CPU) for performing various control operations in accordance with programs and storage units (ROM and RAM) for storing various programs. The storage units store the programs of the communication control processing means 8a, the key operation control processing means 8b, the position information registering means 8c, the position information storage means 8d, the position information collating means 8e, and the image input control means 8f.

Reference numeral 9 denotes a lens for inputting images; 10, an image input processor for performing image signal input processing and data compression processing; and 11, an image data storage for storing image data processed by the image input processor.

Figure 5:
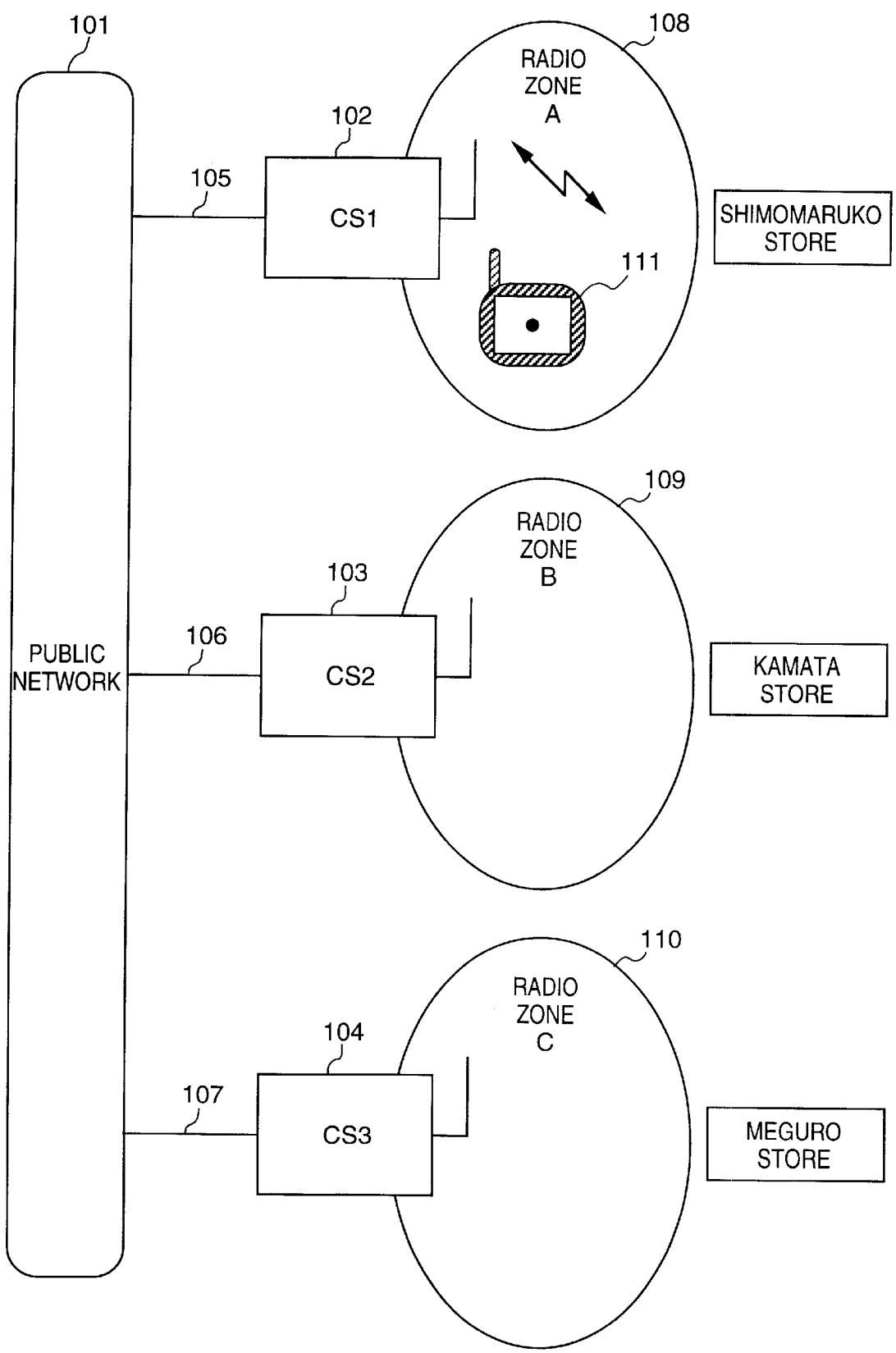
FIG. 5 is a view showing the system configuration of the first embodiment of the present invention.

FIG. 5 is a view showing a PHS radio communication system for explaining this embodiment. In FIG. 5, reference numeral 101 denotes a public network; 102, 103, and 104, public base stations; 105, 106, and 107, communication lines connecting the public network and the public base stations; 108, a radio zone or cell A served by the public base station 102; 109, a radio zone B served by the public base station 103; and 110, a radio zone C served by the public base station 104.

Reference numeral 111 denotes the image input apparatus used in this embodiment.

Several operation flow charts of this embodiment will be described below. Assume that the processor of the controller 8 reads out various programs stored in the storage units described above and performs various control operations.

Figure 6:
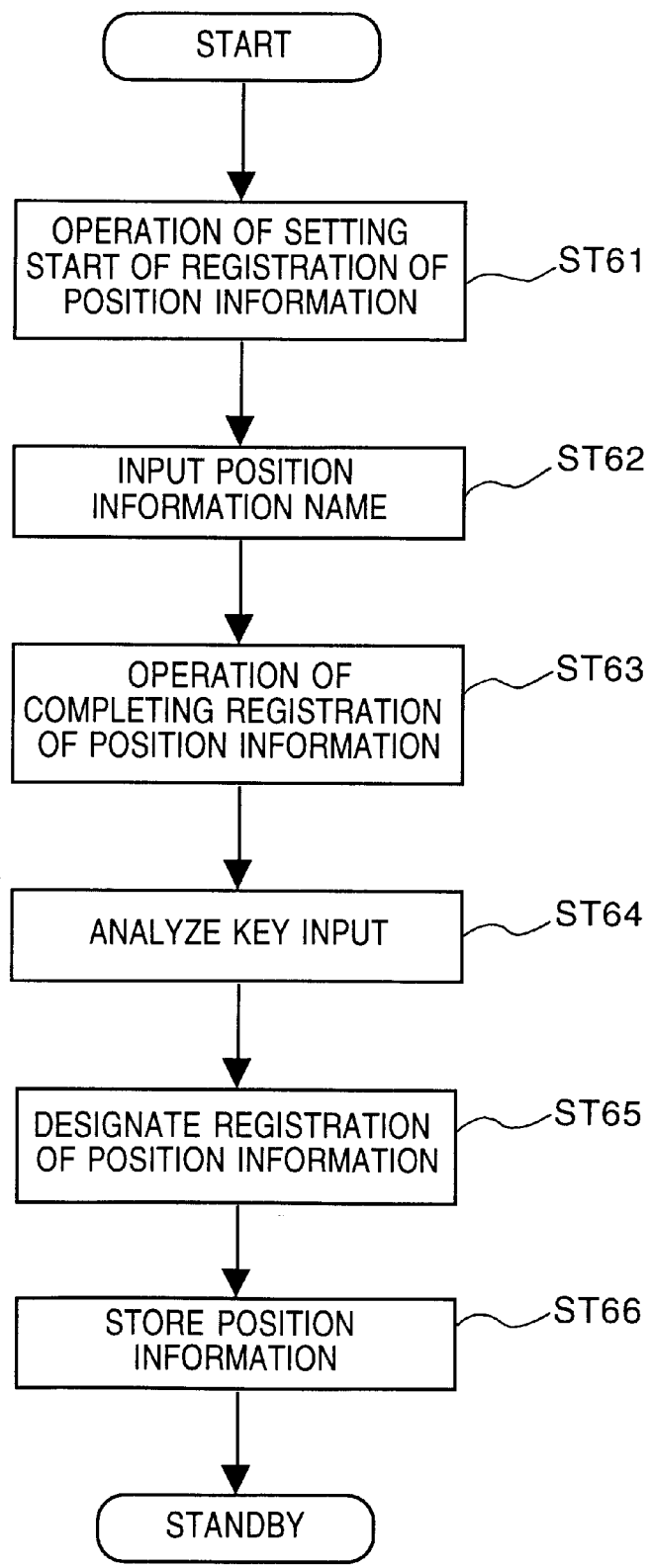
FIG. 6 is a flow chart showing an operation when the image input apparatus of the first embodiment of the present invention registers position information.
Figure 7:
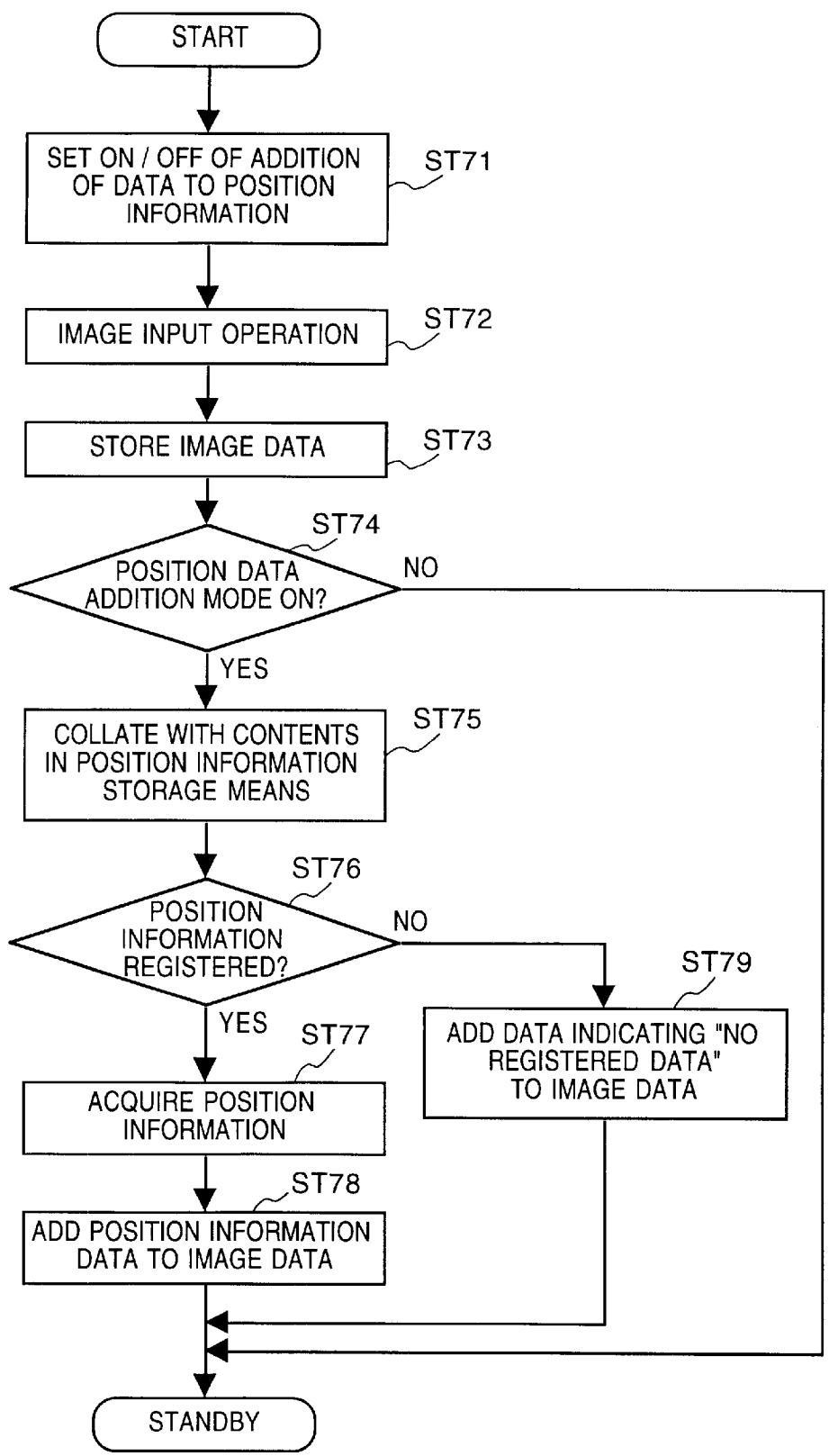
FIG. 7 is a flow chart showing an operation when the image input apparatus of the first embodiment of the present invention adds position information to image data.

FIGS. 6 and 7 are flow charts for explaining operations of this embodiment.

First, position information registration will be described.

In the standby state in which the image input apparatus is in a radio zone of a certain public base station and receiving the common control signal (PCH) from the base station, the user depresses a position information key (not shown) on the key operation unit 7 of the image input apparatus to set the start of position information registration (ST61).

The user then inputs a position information name by alphabetical keys (not shown) and a conversion key (not shown) on the key operation unit 7 (ST62).

If the image input apparatus is in the radio zone A in FIG. 5, the user inputs "Shimomaruko Store" as the position information name.

After inputting the position information name, the user depresses a registration key (not shown) on the key operation unit 7 to complete the position information registration (ST63).

The key operation unit sends these key input information to the controller 8. The key operation control processing means 8b of the controller 8 analyzes these information (ST64) and instructs the position information registering means 8c to store "Shimomaruko Store" as the position information of the base station identification code transmitted from the current public base station (ST65).

These position information and base station identification code are related and stored in the position information storage means 8d (ST66).

An operation of inputting an image will be described next.

This operation will be explained by taking image input of a display of goods in a convenience store as an example.

Assume that the contents shown in FIG. 4 are stored in the position information storage means 8d of the image input apparatus. Assume also that the positions of the radio zones A, B, and C are the Shimomaruko Store, Kamata Store, and Meguro Store, respectively, in FIG. 5.

An operation when the image input apparatus inputs an image of a display of goods at the Shimomaruko Store, i.e., in the radio zone A will be described below.

If the user wants to first add position information data to image data, he or she depresses a position data key (not shown) on the key operation unit 7 of the image input apparatus to set a position data addition mode (ST71).

Note that the controller 8 controls ON/OFF of this position data addition mode; no position information is added to image data if the mode is OFF.

The user then starts image input by depressing an input key (not shown) on the key operation unit 7 (ST72). Consequently, an image is input through the lens 9, the image data is input and compressed by the image input processor 10, and the processed data is stored in the image data storage 11 (ST73).

The controller 8 checks whether the position data addition mode is ON or OFF. If the mode is ON (ST74), the position information collating means 8e collates the base station identification code in the common control signal (PCH) intermittently transmitted from the public base station and received immediately after the image input operation with the contents in the position information storage means 8d (ST75). If the collation result indicates that the corresponding position information is registered (ST76), the position information is acquired (ST77), and the data of the position information is added to the image data stored in the image data storage 11 (ST78).

For example, if the image input apparatus 111 is in the radio zone A and receives a base station identification code ("000001000"), the position information data "Shimomaruko Store" as the position information corresponding to this base station identification code is added to the image data.

If the collation result in step ST76 indicates that the corresponding position information is not registered, data indicating "no registered data" is added as the position information data (ST79).

Analogously, if the image input apparatus 111 is in the radio zone B 109 and the radio zone C 110, the position information data "Kamata Store" and "Meguro Store", respectively, are added to the input image data.

An operation of transmitting input image data will be described next.

Figure 8:
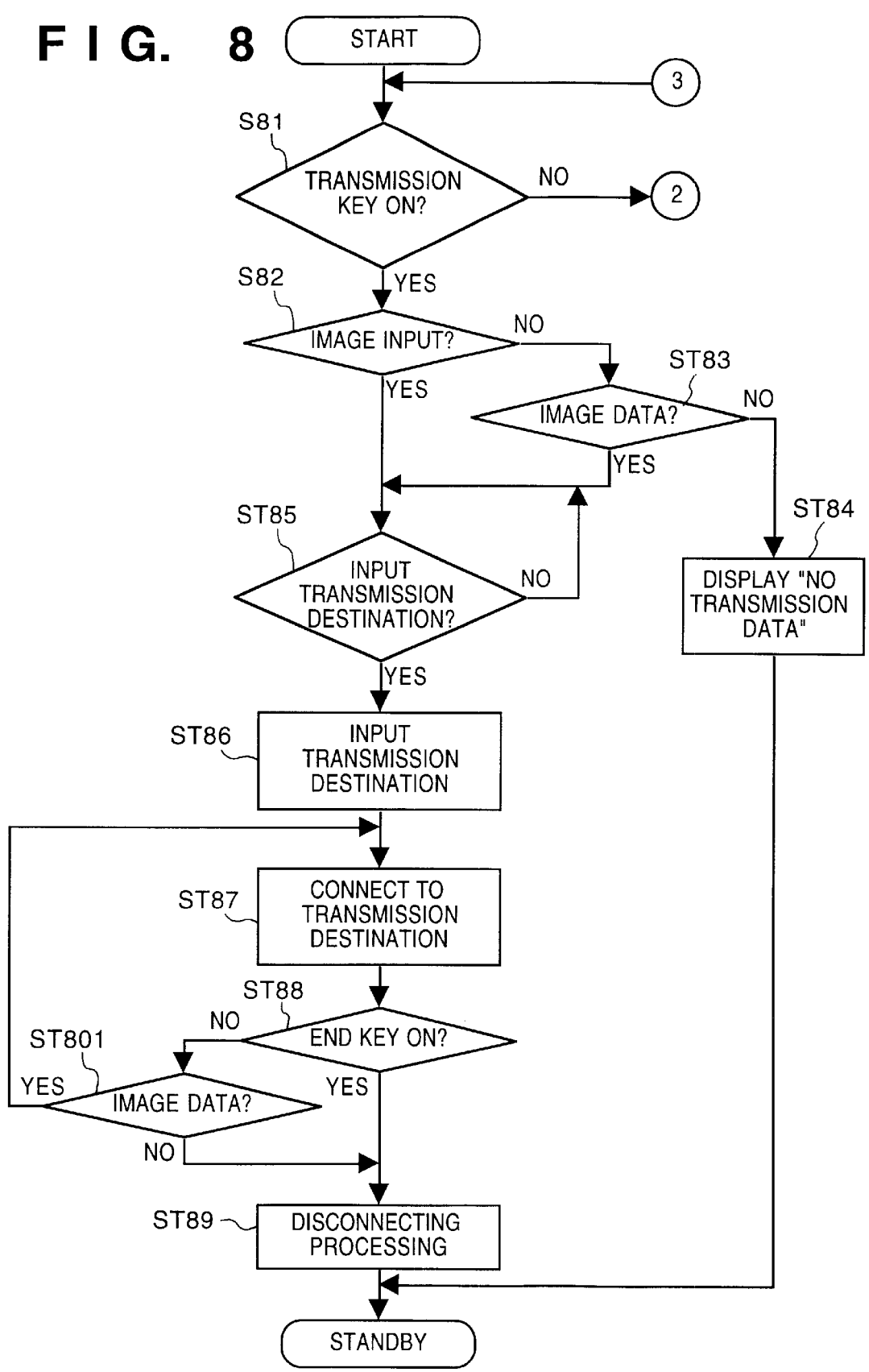
FIG. 8 is a flow chart showing an operation when the image input apparatus of the first embodiment of the present invention transmits image data.

FIG. 8 is a flow chart showing the operation of the image input apparatus when image data is transmitted.

Referring to FIG. 8, when a transmission key (not shown) on the key operation unit 7 is depressed (ST81), the controller 8 checks whether image input is being performed (ST82). If no image input is being performed in step ST82, the controller 8 checks whether image data is stored in the image data storage 11 (ST83).

If no image data is stored in the image data storage 11 in step ST83, the controller 8 displays information indicating that there is no image data to be transmitted on a display unit (not shown) (ST84). If image input is being performed in step ST82 or image data is stored in the image data storage 11 in step ST83, the controller 8 waits until the dial number of the transmission destination is input from the key operation unit 7 (ST85). If the dial number is input, the communication control processing means 8a establishes connection with the other party via the base station (ST86) and supplies the image data stored in the image data storage 11 to the channel CODEC 3. The image data is assembled into a frame by the channel CODEC 3, modulated by the modulator/demodulator 4, and transmitted via the RF unit 5 and the antenna 6 (ST87). The transmission of the image data is continued until an end key (not shown) on the key operation unit 7 is depressed (ST88) or the image data is completely sent to the image data storage 11 (ST801). If the end key on the key operation unit 7 is depressed or the data stored in the image data storage 11 is completely sent, the communication control processing means 8a terminates connection with the transmission destination via the base station (ST89).

The image data transmitted at this time is image data having position information if the position information is added to the image data, or image data having no position information if no position information is added to the image data.

An operation when voice communication is performed by using the handset 1 and the speech processor 2 of the image input apparatus will be described below.

Figure 9:
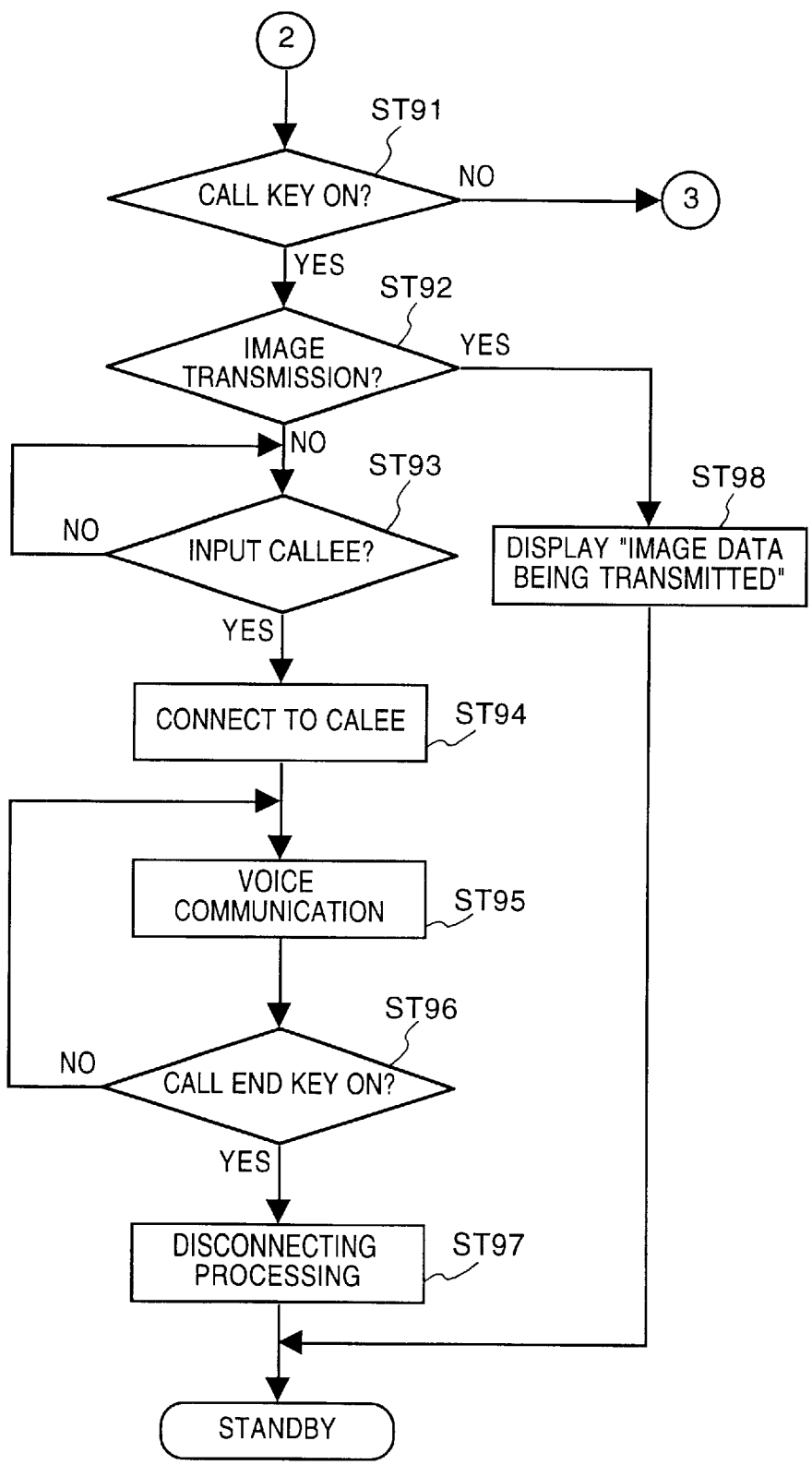
FIG. 9 is a flow chart showing an operation when the image input apparatus of the first embodiment of the present invention is used to perform voice communication.

FIG. 9 is a flow chart showing the operation when voice communication is performed by using the image input apparatus.

Referring to FIG. 9, if a call key (not shown) on the key operation unit 7 is depressed (ST91), the controller 8 checks whether image data is being transmitted (ST92). If image data is being transmitted, the controller 8 displays information indicating that no voice communication can be performed because image data is being transmitted on the display unit (not shown) (ST98). If no image data is being transmitted, the controller 8 waits until the dial number of the callee is input from the key operation unit 7. If the dial number is input (ST93), the controller 8 establishes connection with the callee via a base station by using the communication control processing means 8a (ST94), and starts voice communication (ST95). Even if image input is being performed, the controller 8 performs the image input processing parallel to the voice communication processing. That is, the controller 8 performs the voice communication processing and also stores an input image from the lens 9 into the image data storage after processing, e.g., compressing the image by the image input processor 10.

If a call end key (not shown) on the key operation unit 7 is depressed (ST96), the controller 8 performs processing for terminating connection with the callee (ST97).

Second Embodiment

Figure 10:
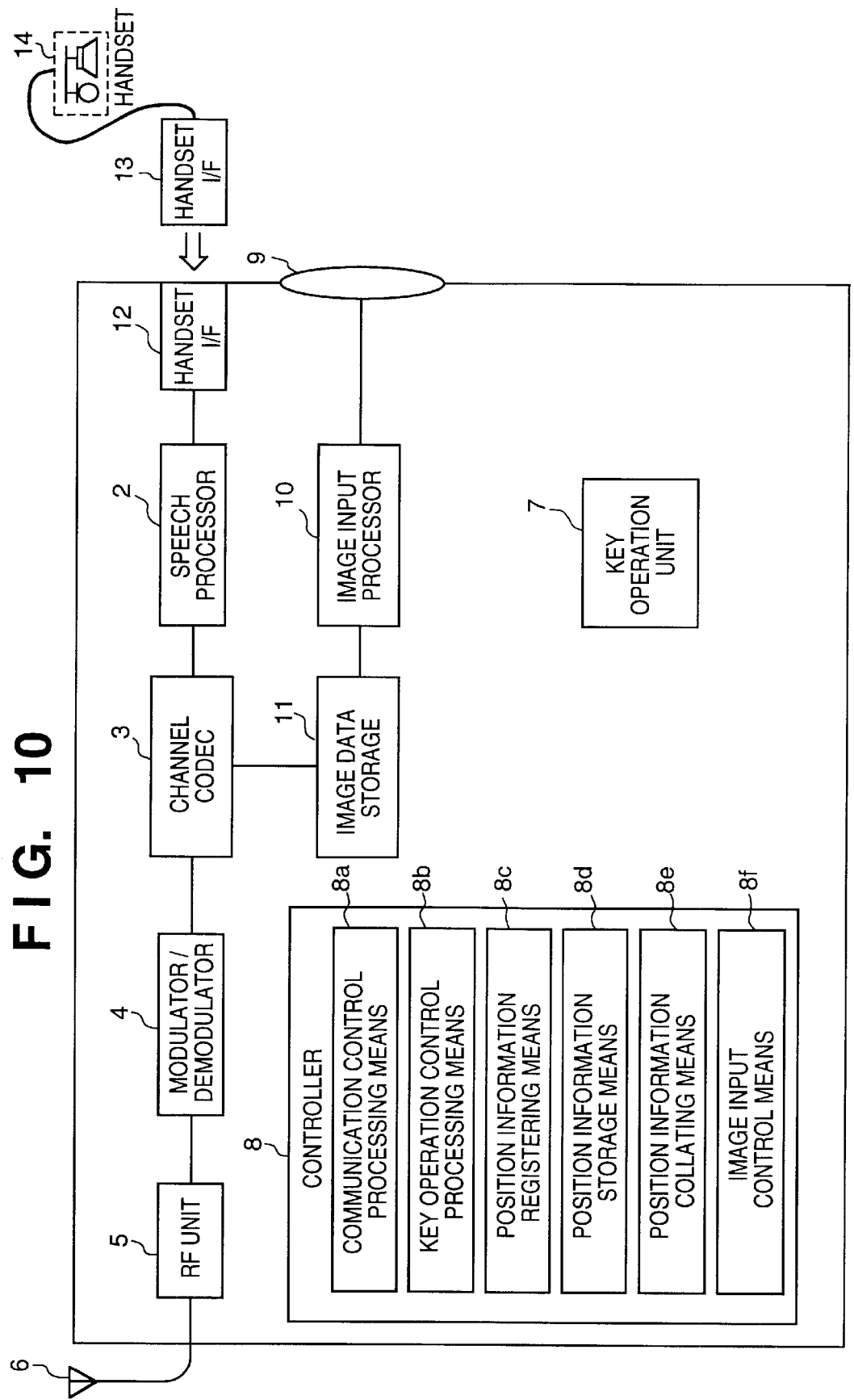
FIG. 10 is a block diagram of an image input apparatus according to the second embodiment of the present invention.

FIG. 10 is a block diagram of an image input apparatus used in the second embodiment.

In FIG. 10, reference numeral 12 denotes a handset interface (I/F) for connecting to an external handset 14; 13, an external handset interface connected to the handset 14 through a cord to connect to the handset interface 12; and 14, a handset (or headset) for inputting/outputting speech. Reference numerals 2 to 11 denote the same parts as in the first embodiment, and a detailed description thereof will be omitted.

When image input is performed by using the image input apparatus shown in FIG. 10, a key operation control processing means 8b analyzes key input from a key operation unit 7 and performs processing corresponding to the analytical result. An image input control means 8f performs image input by controlling an image input processor 10 and an image data storage 11.

When data stored in the image data storage 11 is transmitted, the stored data is subjected to processing such as frame assembly by a channel CODEC 3, modulated by a modulator/demodulator 4, and transmitted via an RF unit 5 and an antenna 6.

As described above, when the handset for telephone conversation is connected to the image input apparatus through a cord, the user can readily talk with the other party while inputting an image.

Third Embodiment

Figure 11:
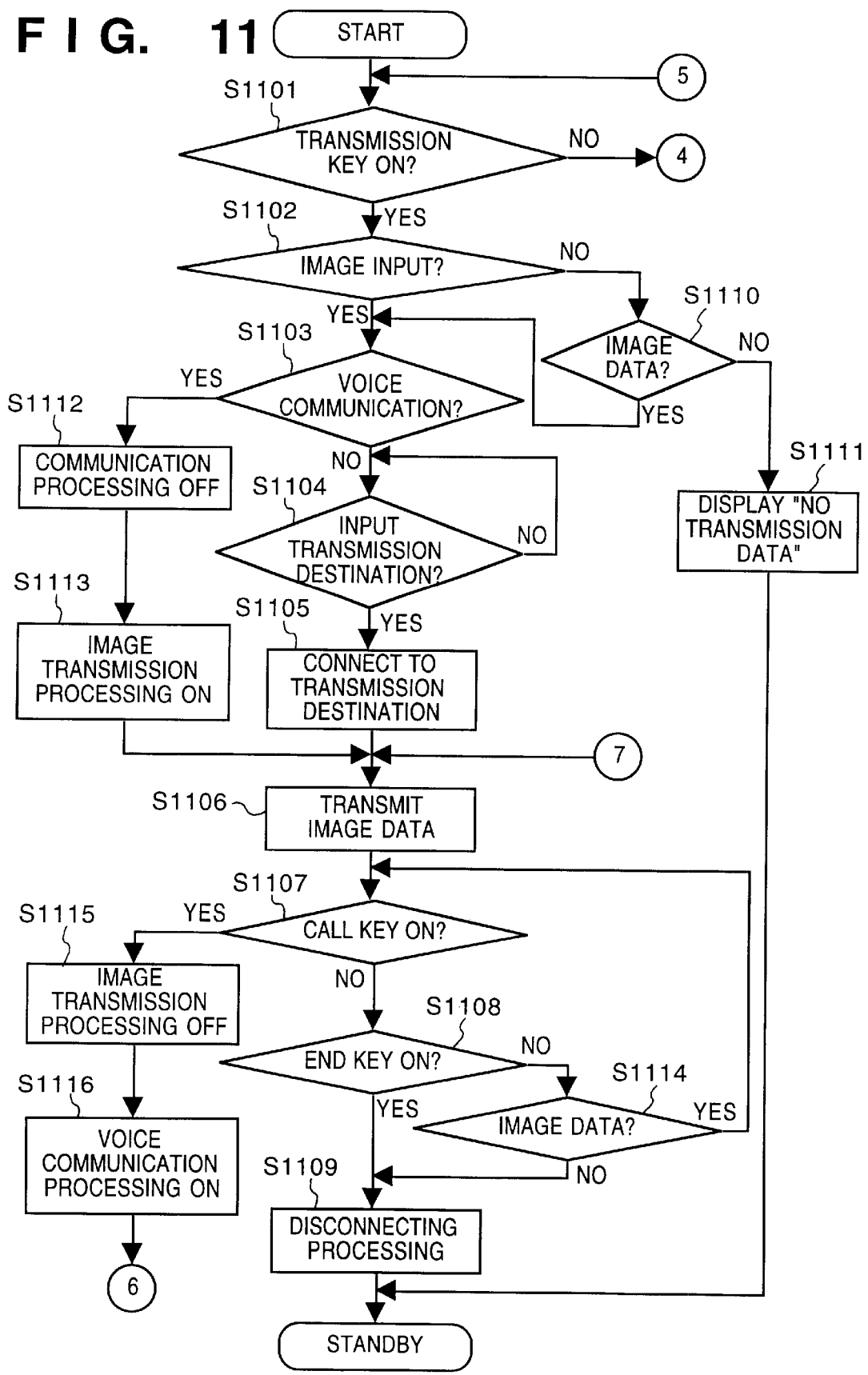
FIG. 11 is a flow chart showing image data transmission and voice communication by an image input apparatus according to the third embodiment of the present invention.
Figure 12:
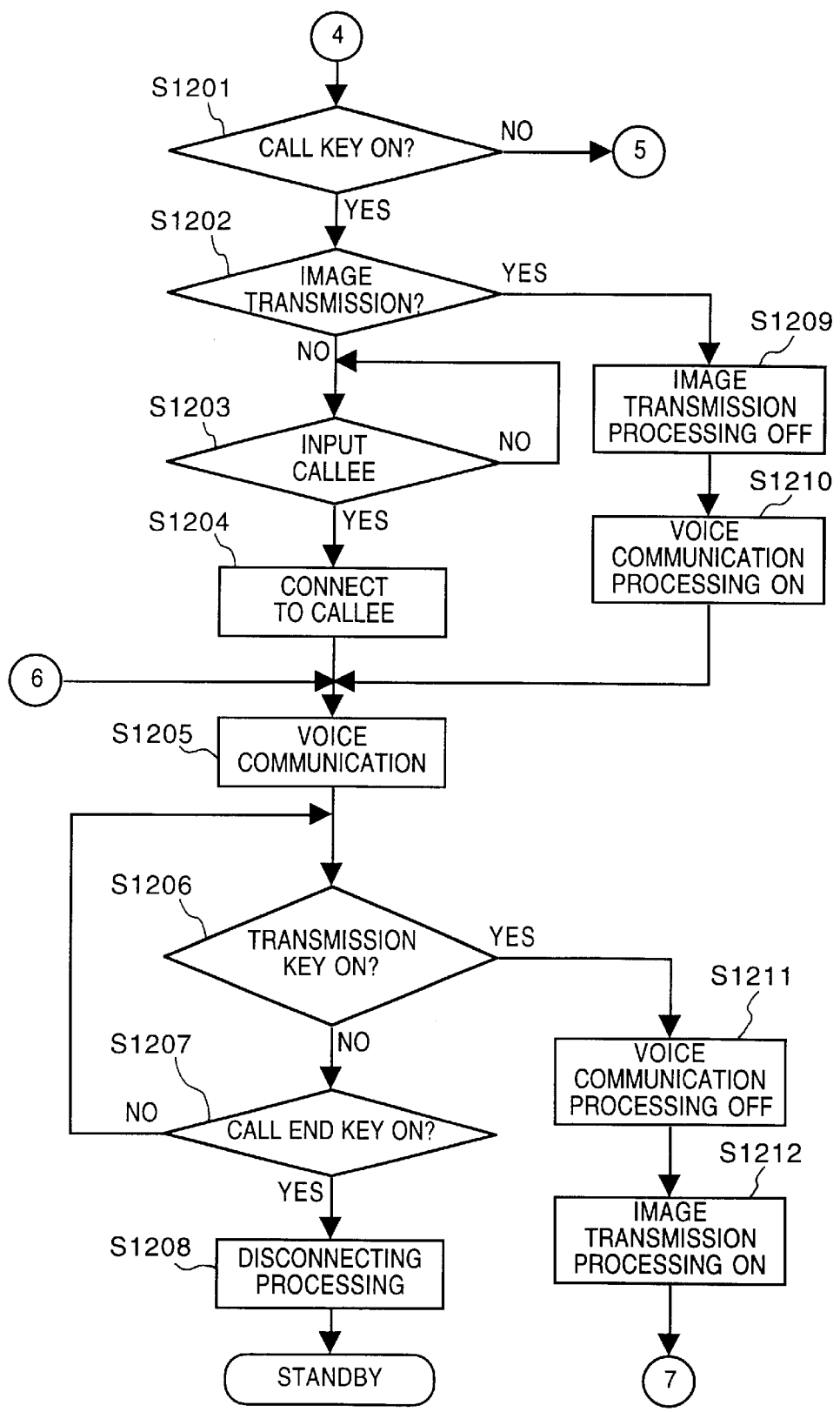
FIG. 12 is a flow chart showing image data transmission and voice communication by the image input apparatus according to the third embodiment of the present invention.

FIGS. 11 and 12 are flow charts showing operations of an image input apparatus according to the third embodiment.

The arrangement of the image input apparatus of the third embodiment is the same as FIG. 1, so a detailed description thereof will be omitted.

Also, the common control signal transmitted by a base station, the system configuration, the operation of registering position information in a position information storage means, and the operation of adding position information to image data in the third embodiment are the same as those in the first embodiment, so a detailed description thereof will be omitted.

Referring to FIG. 11, when a transmission key (not shown) on a key operation unit 7 is depressed (S1101), a controller 8 checks whether image input is being performed (S1102).

If no image input is being performed in step S1102, the controller 8 checks whether image data is stored in an image data storage 11 (1110).

If no image data is stored in the image data storage 11 in step S1110, the controller 8 displays information indicating that there is no image data to be transmitted on a display unit (not shown) (S1111). If image input is being performed in step S1102 or image data is stored in the image data storage 11 in step S1110, the controller 8 checks whether voice communication is being performed by using a handset 1, a speech processor 2, a channel CODEC 3, a modulator/demodulator 4, an RF unit 5, and an antenna 6 (S1103).

If no voice communication is being performed in step S1103, the controller 8 waits until the dial number of the transmission destination is input from the key operation unit 7 (S1104). When the dial number is input, a communication control processing means 8a establishes connection with the other party via a base station (ST1105) and supplies image data stored in the image data storage 11 to the channel CODEC 3. This image data is assembled into a frame by the channel CODEC 3, modulated by the modulator/demodulator 4, and transmitted via the RF unit 5 and the antenna 6 (ST1106).

If voice communication is being performed in step S1103, the controller 8 aborts the processing operations by the handset 1 and the speech processor 2 and aborts the voice communication processing (S1112). The controller 8 then starts processing for supplying image data stored in the image data storage 11 to the channel CODEC 3, assembling the image data into a frame by the channel CODEC 3, modulating the image data by the modulator/demodulator 4, and transmitting the image data via the RF unit 5 and the antenna 6 (S1113). Thus the controller 8 transmits the image data to the other party of the voice communication (S1106).

The controller 8 monitors whether a call key (not shown) on the key operation unit 7 is depressed while the image data is being transmitted in step S1106 (S1107). If the call key is not depressed, the controller 8 monitors whether an end key (not shown) on the key operation unit 7 is depressed (S1108) or the image data in the image data storage 11 is completely transmitted (S1114).

If the end key on the key operation unit 7 is depressed or the data stored in the image data storage 11 is completely transmitted, the communication control processing means 8*a* terminates connection with the transmission destination via the base station (S1109).

If the call key is depressed in step S1107, the controller 8 aborts the image data transmission processing for supplying the image data stored in the image data storage 11 to the channel CODEC 3, assembling the image data into a frame by the channel CODEC 3, modulating the image data by the modulator/demodulator 4, and transmitting the image data via the RF unit 5 and the antenna 6, and starts voice communication processing using the handset 1, the speech processor 2, the channel CODEC 3, the modulator/demodulator 4, the RF unit 5, and the antenna 6 (S1116). The callee at this time is the other party connected to transmit the image during the image transmission.

If the transmission key is not depressed in step S1101, the controller 8 monitors whether the call key (not shown) on the key operation unit 7 is depressed (S1201).

If the call key is not depressed in step S1201, the flow returns to step S1101. If the call key is depressed, the controller 8 checks whether image data is being transmitted (S1202).

If no image data is being transmitted in step S1202, the controller 8 waits until the dial number of the callee is input from the key operation unit 7. When the dial number is input (S1203), the controller 8 uses the communication control processing means 8*a* to establish connection with the callee via the base station (S1204) and start voice communication (S1205).

At this time, even if image input is being performed, the controller 8 performs the image input processing parallel to the voice communication processing. That is, the controller 8 performs the voice communication processing and also stores an input image from the lens 9 into the image data storage after processing, e.g., compressing the image by an image input processor 10.

If image data is being transmitted in step S1202, the controller 8 aborts the image data transmission processing for supplying the image data stored in the image data storage 11 to the channel CODEC 3, assembling the image data into a frame by the channel CODEC 3, modulating the image data by the modulator/demodulator 4, and transmitting the image data via the RF unit 5 and the antenna 6 (S1209), and starts the voice communication processing using the handset 1, the speech processor 2, the channel CODEC 3, the modulator/demodulator 4, the RF unit 5, and the antenna 6 (S1210), thereby starting voice communication (S1205).

While voice communication is being performed in step S1205, the controller 8 monitors whether the transmission key for image transmission on the key operation unit 7 is depressed (S1206).

If the transmission key is not depressed in step S1206, the controller 8 monitors whether a call end key (not shown) on the key operation unit 7 is depressed (S1207). If the call end key is depressed in step S1207, the controller 8 performs processing for terminating connection with the callee (S1208).

If the transmission key is depressed in step S1206, the controller 8 aborts the processing operations by the handset 1 and the speech processor 2 and aborts the voice communication processing (S1211). The controller 8 then starts processing for supplying image data stored in the image data storage 11 to the channel CODEC 3, assembling the image data into a frame by the channel CODEC 3, modulating the image data by the modulator/demodulator 4, and transmitting the image data via the RF unit 5 and the antenna 6 (S1212), thereby transmitting the image data to the other party of voice communication.

Note that the image data to be transmitted is image data having position information if the position information is added to the image data, or image data having no position information if no position information is added to the image data.

In this embodiment as described above, the user can talk with the other party over the phone while transmitting image data to him or her. Accordingly, the user can transmit image data while asking the other party the transmission result.

Figure 13:
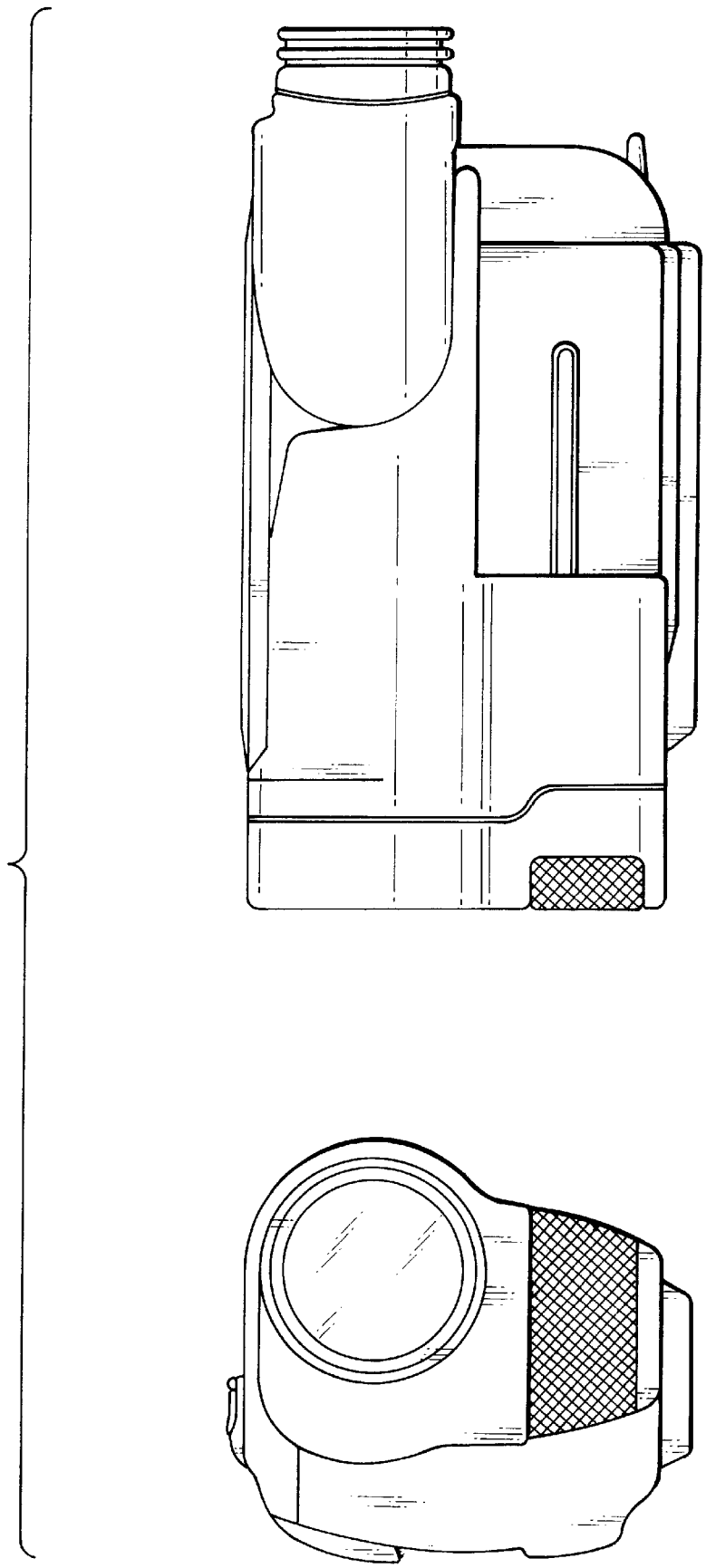
FIG. 13 is a view showing the outer appearance of the image input apparatus of the embodiments of the present invention.

Note that the image input apparatus in each of the first, second, and third embodiments is a handy type video camera or a handy type camera as shown in FIG. 13.

The above first, second, and third embodiments have been described by taking a PHS as an example. However, similar effects can be obtained by using a system of another radio medium.

Also, in the first, second, and third embodiments, information to be added to image data is position information. However, this additional information is not necessarily position information and can be any information pertaining to a base station transmitting a common control signal.

Furthermore, the first, second, and third embodiments have been described merely as an image input apparatus. However, the image input unit of the image input apparatus in each of the first, second, and third embodiments is similar to a camera for photographing still images or a video camera for taking moving images.

In the present invention as has been described above, once information such as a photographing location is input in relation to a common control signal from each base station, this information can be automatically added to image data from the next image input. This obviates the need for manually inputting such information each time an image is input and can also prevent information input errors.

Also, image data to which information such as a photographing location corresponding to a common control signal from each base station is added can be transmitted by radio communication.

Additionally, it is possible to simultaneously perform transmission of image data, to which information such as a photographing location corresponding to a common control signal from each base station is added, and voice communication processing. Therefore, the user can transmit image data while talking with the other party.

Fourth Embodiment

Figure 14:
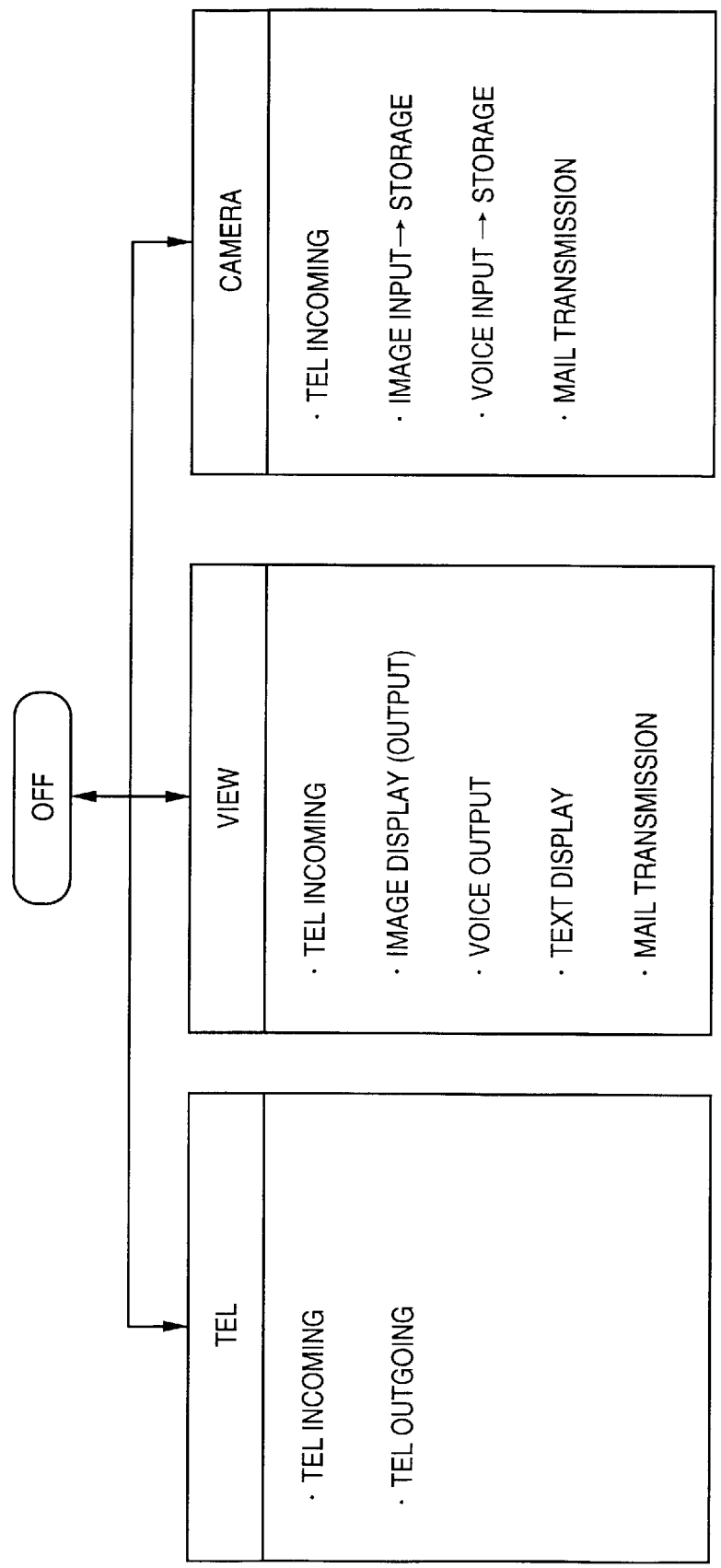
FIG. 14 is a view for explaining functions in the individual modes of an image input apparatus according to the fourth embodiment of the present invention.

FIG. 14 is a view for explaining functions in the individual modes of an image input apparatus according to this embodiment. FIGS. 15, 16, and 17 are views showing the outer appearance of the image input apparatus. In particular, FIG. 17 is a front view of a mode dial also serving as a power switch.

A mode dial 101 including a power switch can rotate around a shutter button 102 of a camera. By this rotation it is possible to switch a power-off state (OFF), a call transmission/reception enable state (TEL), a state in which images, voices, and texts stored in a main body are displayed (VIEW), and a camera photography enable state (CAMERA).

As shown in FIG. 14, an incoming telephone call can be received in modes other than the OFF mode.

In the TEL mode, the functions of a normal, PHS telephone set are operable. That is, it is possible to input a telephone number from a keyboard 103 of the main body, display the input number on a black-and-white liquid crystal display 104, and display a telephone book. Voice communication is performed by using a loudspeaker 105 and a microphone 106 incorporated into the main body. If necessary, complicated optional functions can be easily chosen by displaying the functions in different colors by using a color liquid crystal display 107.

Call transmission/reception mentioned in this embodiment includes transmission/reception of data communication which is made possible by a PHS or a portable telephone set in recent years.

In the VIEW mode, photographed images, recorded voices, and received images, voices, and texts obtained in the CAMERA mode (to be described below) are selectively reproduced or displayed.

In the CAMERA mode, an image formed via a lens 108 provided in the main body is converted into an electrical signal by a photoelectric conversion device such as a CCD and stored in a storage means such as a flash memory after being processed, where necessary, by the main body. An electronic flash 109 is arranged above the lens 108 of the main body. This electronic flash 109 illuminates an object when flash photography is selected from a menu displayed on the color liquid crystal display 107 by using a pointing device 110.

The CAMERA mode also has functions of checking a photographed image and erasing the image if it is unnecessary, recording a voice comment in accordance with a photographed image, and transmitting a photographed image as a mail to a desired destination (playback function).

<Explanation of Blocks>

As shown in FIG. 18, this image input apparatus comprises four main blocks, i.e., a camera block 200, a sub CPU block 201, a CPU block 202, and a PHS block 203. These blocks cooperate with each other under the control of a CPU 215 which operates in accordance with programs stored in a ROM 212, thereby achieving the respective functions in the TEL, VIEW, and CAMERA modes.

Detailed functions of the individual blocks will be described below with reference to FIG. 18.

[Camera Block]

The camera block 200 includes a lens 204, a photoelectric conversion device 205, and an image processing unit 206. The photoelectric conversion device 205 such as a CCD converts an image projected on the device into an electrical signal.

The image processing unit 206 A/D-converts the output electrical signal and further performs image processing such as gamma conversion, color space conversion, AE (Auto Exposure), and AWB (Auto White Balance) for the digital signal.

An electronic flash 207 emits light in accordance with a signal from the CPU 215 of the CPU block 201.

[(Sub CPU Block]

The sub CPU block 201 has the following blocks and functions.

That is, the sub CPU block 201 includes a sub CPU 216, the mode dial 101, and various switches such as a shutter switch 208, and transmits a command corresponding to an input signal to the CPU block 202. Also, on the basis of an input signal from a keyboard 209, the sub CPU 216 serially transfers and displays a command and display data on a black-and-white display 210 for displaying a telephone number and the like.

Additionally, the sub CPU 216 is connected to an RTC 211 for generating a calender or time information. The sub CPU 216 can obtain date or time information and display the information on the black-and-white display 210 or transmit the information to the CPU block 202.

The sub CPU 216 is also connected to and communicates with the PHS block 203. In accordance with commands designated by the CPU block 202, the sub CPU 216 exchanges AT commands (additional data) for performing protocol control and the like or communicates data such as a received telephone number, the field intensity of the PHS block, and the identification information CS-ID of a radio (PHS) base station.

The sub CPU 216 is further connected to a battery 217 to receive the remaining amount of battery energy or information (e.g., the voltage and the temperature) of the battery during charging and perform processing corresponding to the information. For example, the sub CPU 216 monitors the output voltage from the battery and executes protection processing if overcharge or overdischarge is detected.

[CPU Block]

The CPU block 202 can store input image information from the camera block 200 and input image, voice, and text information from the PHS block 203. The CPU 215 can read out and erase information stored in a flash ROM 213.

The CPU block 202 can also output the stored information to the PHS block 203 and transmit the information to the outside of the apparatus in accordance with a protocol (to be described later). The CPU block 202 further includes IrDA (Infrared Data Association) and RS232C as interfaces (I/Fs) to the outside of the apparatus.

The CPU block 202 has a color liquid crystal display 214 as a display means and displays stored images and texts, input images from the camera block as a view finder, and a menu for setting various conditions.

Input image information from the camera block 200 is once stored in a DRAM 220, and the data amount is reduced by known JPEG (Joint Photographic Coding Experts Group) compression by the CPU 215. Thereafter, the compressed data is stored in the flash ROM 213 in accordance with a predetermined format.

The CPU 215 controls the entire apparatus. That is, the CPU 215 performs various control operations such as start-up and shut-down of the apparatus in accordance with programs stored in the ROM 212.

Also, the CPU 215 relates CS-ID (base station identification code) reported from the PHS block 203 to position information input from the keyboard of the sub CPU block 201 and reported from the sub CPU 216. The CPU 215 then stores the information together with a photographed image in a flash ROM 213 or checks whether the CS-ID reported from the PHS block 203 is already stored in the flash ROM 213.

[PHS Block]

The PHS block primarily performs radio communication.

A PHS CPU 221 performs communication control in accordance with a communication protocol of a PHS.

A handset 222 includes a microphone and a loudspeaker for transmitting and receiving speech.

A speech processor 223 performs compression encoding and expansion decoding for speech.

A channel CODEC 224 performs TDMA processing such as disassembling/assembling of a frame, error correction processing, scramble processing, and privacy conversation processing for speech.

A modulator/demodulator 225 modulates transmission data and demodulates received data. An RF unit 226 exchanges radio signals by using an antenna 227.

Figure 23:
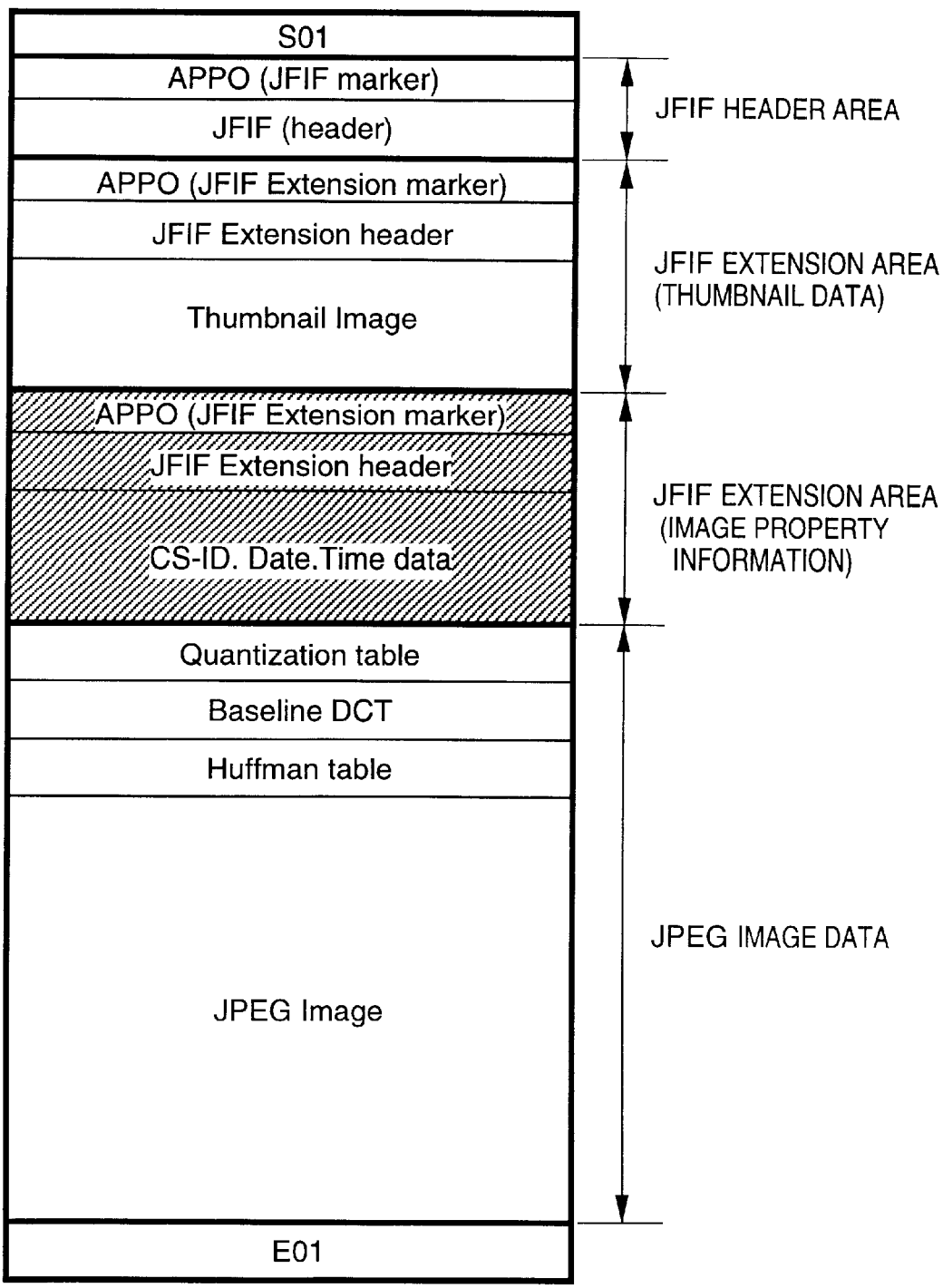
FIG. 23 is a view of an image file format by which a photographed image is stored in the fourth embodiment of the present invention.

Photographed images are stored in the flash ROM 213 as shown in FIG. 23.

Referring to FIG. 23, JFIF is a known image file format and is the abbreviation for JPEG File Interchange Format.

SOI (Start Of Image) is in the first position of the file. In APPO (Application reservation start marker), a declaration (JFIF marker) indicating that the file has the JFIF format is arranged first and followed by a header indicating the contents.

In addition, APPO also declares a JFIF extension area. In FIG. 23, thumbnail image data (JPEG compressed data with a low resolution) is stored in the JFIF extension area. The next area is an extension area in which CS-ID and date information stored in the flash ROM 213 of the CPU block 202 are written.

In a JFIF extension header, information such as the type of subsequent data and the size of the file are written.

<Explanation of Operation Control of Main Body>

Control operations performed by the CPU 215 in various modes in accordance with the programs stored in a ROM 212 will be described below with reference to FIGS. 19 to 22.

FIG. 19 is a flow chart showing the control procedure of a camera photographing operation called the CAMERA mode.

In step S1901 of FIG. 19, the CPU 215 is informed of power ON or switching to the CAMERA mode by the sub CPU 216. In step S1902, the CPU 215 starts charging a capacitor for causing the electronic flash to emit light.

This is done to be able to allow the electronic flash to emit light immediately after the mode is switched to flash photography.

In step S1903, the CPU 215 enables a CCD module including a CCD controller. In step S1904, the CPU 215 starts displaying an electronic viewfinder (EVF (the color LCD 214)) on the color liquid crystal display to check an object during photography.

In step S1905, the CPU 215 detects any key operation by the user. If no key operation is detected, the flow advances to step S1906. If a key operation is detected, the flow advances to FIGS. 20A and 20B.

Continuous processing until an input image from the camera block is displayed on the EVF (color LCD 214) will be described below from step S1906.

In step S1906, the CPU 215 causes the photoelectric conversion device 205 such as a CCD to convert optical information of an object supplied from the camera lens 204. This output signal is a non-interlace analog signal. To increase the processing speed, data of a reduced size of 320×240 dots, rather than a total pixel number of 640×480 dots, is output by decimation.

The input signal in step S1906 is supplied to the image processing unit 206 such as an image processor. In step S1907, the signal is subjected to AWB (Auto White Balance), AE, correction processing when flash photography is performed, or signal conversion to the YCrCb (luminance, color difference signal) (4:2:2) format.

In step S1908, the YCrCb-converted signal is subjected to processing by software to correct any shift of the aspect ratio caused by the difference between the processing frequencies of the input image from the CCD and the output image to the EVF (color LCD 214).

In step S1909, the processed signal is converted into an NTSC (National Television System Committee) signal by an NTSC encoder. In step S1910, this NTSC signal is output to an LCD controller. Upon receiving the output signal from the LCD controller, the EVF (color LCD 214) displays the object image in step S1911.

By continuously looping the processing steps from S1906 to S1911 at a cycle of 1/30 sec, the object image is constantly monitored on the EVF (color LCD 214).

If a key operation by the user is detected (YES in step S1905) during this loop of monitoring the image, an interrupt event occurs due to the detection signal, and the CPU 215 advances the flow to interrupt processing A.

Figure 20A:
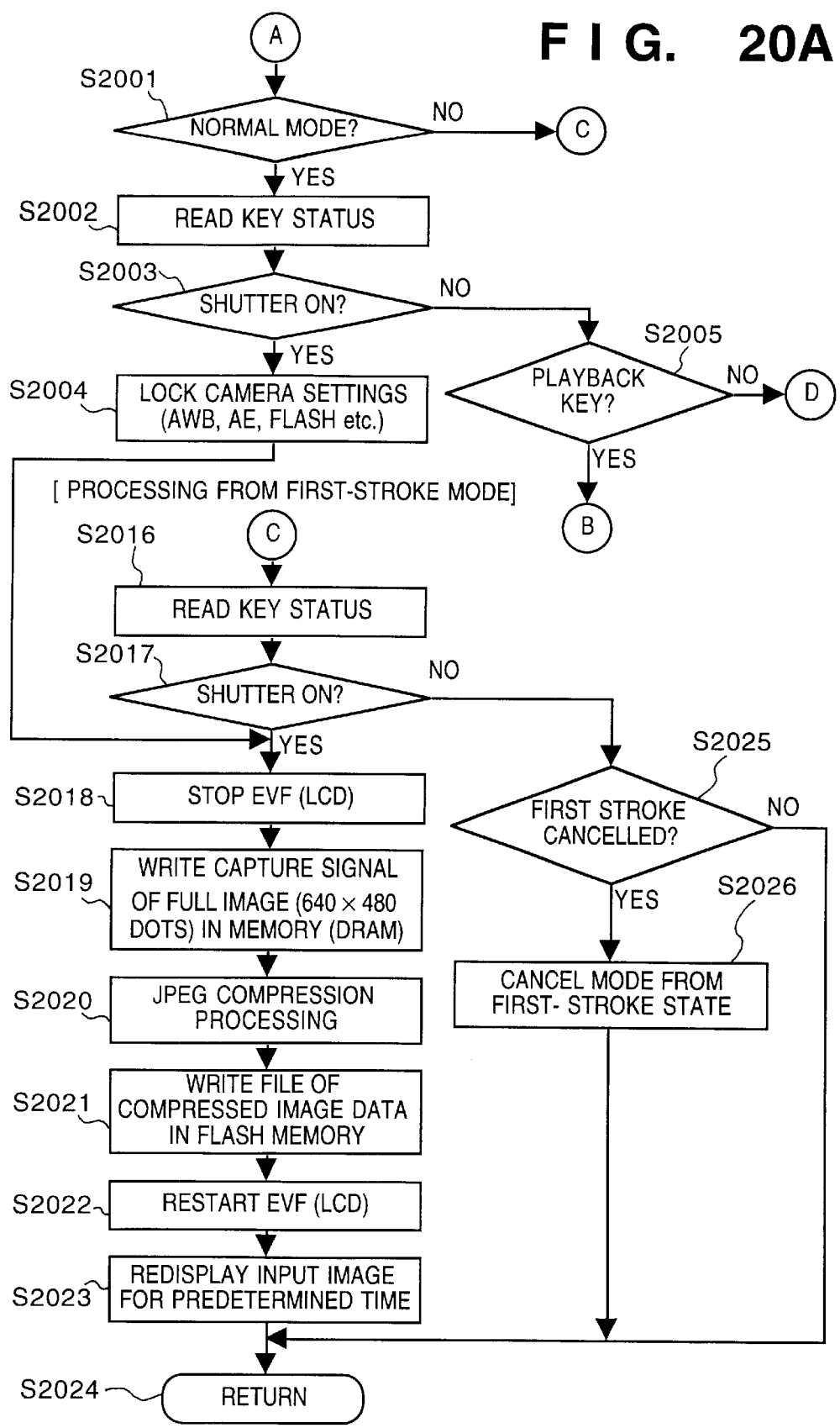
FIGS. 20A and 20B are flow charts showing the control procedure of interrupt processing done by a key manipulation during the camera photographing operation in the fourth embodiment of the present invention.
Figure 20B:
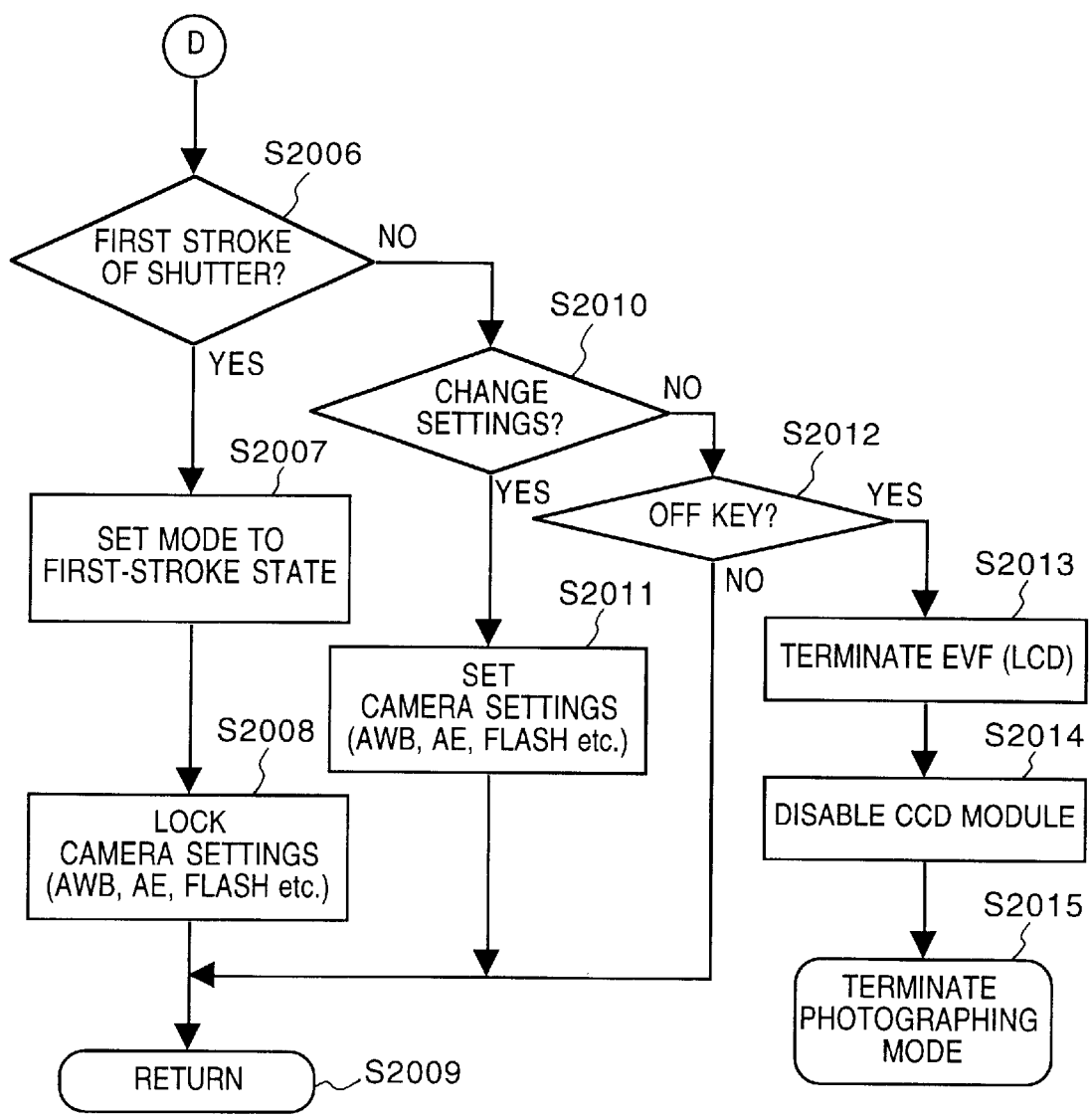

FIGS. 20A and 20B are flow charts showing the control procedure of the interrupt processing started by a key operation during the camera photographing operation.

When a key operation occurs in step S1905 of FIG. 19, the internal mode is one of two types of modes. One is a normal mode in which image monitoring explained with reference to FIG. 19 is continuously performed from power ON. The other is a first-stroke mode in which image monitoring is performed after the shutter is depressed to the first stroke to lock various camera settings.

Referring to FIGS. 20A and 20B, in step S2001 the CPU 215 checks whether the key operation occurred in the normal mode or the first-stroke mode.

If the normal mode is detected in step S2001, the flow advances to step S2002, and the CPU 215 causes the sub CPU 216 to perform key status read processing for checking which key operation is performed in the interrupt processing from the normal mode.

If depression of the shutter switch is detected in step S2003, in step S2004 the CPU 215 locks various camera settings in the image processor, such as AWB, AE, and electronic flash correction when flash photography is performed, at the respective current set values. Subsequently, in step S2018 the CPU 215 stops the operation of the EVF (color LCD 214) to reduce the load of processing by the CPU.

In the image monitoring processing explained with reference to FIG. 19, only a signal of a reduced number of pixels is input to increase the processing speed. In step S2019, however, the CPU 215 inputs a capture signal of a full image of the VGA standard (640×480 dots) as a photographed image. After the signal is subjected to predetermined processing by the image processor, the CPU 215 writes the data of the YCrCb signal in the memory (DRAM 220).

In step S2020, this data is subjected to image compression processing based on the JPEG standard. In step S2021, the CPU 215 writes the compressed data as an image file, as shown in FIG. 23, into the flash ROM 213.

During the write the CPU 215 inserts base station identification information (CS-ID) and date data into the file. Thereafter, in step S2022 the CPU 215 restarts the operation of the EVF (color LCD 214) which has been stopped. In step S2023, the CPU 215 allows the EVF (color LCD 214) to display the image data for a predetermined time so that the user can check the photographed image. In step S2024, the CPU 215 completes the interrupt processing, returns the flow to the loop shown in FIG. 19, and restarts the image monitoring processing.

If the CPU 215 detects that a playback key is depressed (S2005) after the key status read processing in step S2002, the flow advances to execution of the processing of a playback function shown in FIG. 21.

If depression of a shutter first-stroke switch is detected in step S2006, in step S2007 the CPU 215 sets the internal state settings to the first-stroke mode. In step S2008, as in step S2004, the CPU 215 locks the various camera settings in the image processor, such as AWB, AE, and electronic flash correction when flash photography is performed, at the respective current set values.

In step S2009, the CPU 215 completes the interrupt processing and returns the flow to the loop shown in FIG. 19.

If depression of a key for changing the photographing conditions is detected in step S2010, in step S2011 the CPU 215 corrects the various camera settings in the image processor, such as AWB, AE, and electronic flash correction when flash photography is performed, in accordance with the changed conditions. In step S2009, the CPU 215 returns the flow to the loop shown in FIG. 19.

If depression of an OFF key is detected in step S2012, the CPU 215 first terminates the operation of the EVF (color LCD 214) (S2013) and then terminates the operation of the CCD module (S2014). In step S2015, the CPU 215 terminates other photographing operations and executes system power-off processing.

If the OFF key is not detected in step S2012, this means that no effective key or switch is detected. Therefore, in step S2009 the CPU 215 returns the flow to the loop shown in FIG. 19 without performing any processing.

The flow of interrupt processing in the first-stroke mode will be described below.

If the CPU 215 determines in step S2001 that the first-stroke mode is set, the flow advances to step S2016, and the CPU 215 performs key status read processing for checking which key is depressed in the interrupt processing from the first-stroke mode.

If depression of the shutter button is detected in step S2017, the flow advances to execution of the photographing processing (described above) from step S2018, while the various camera settings (S2008) in the image processor locked in the previous first-stroke key detection (S2006) are kept effective.

As shown in step S2025, if depression of a first-stroke cancel key is detected as the key status, in step S2026 the CPU 215 cancels the internal state settings from the first-stroke mode. In step S2024, the flow advances to the processing shown in FIG. 19.

If the first-stroke cancel key is not detected in step S2025, this means that no effective key or switch is detected. Accordingly, in step S2024 the CPU 215 advances the flow to the processing shown in FIG. 19 without performing any processing.

FIG. 21 is a flow chart showing the control procedure of playback processing when depression of the playback key is detected in the operated key determination processing (S2005) shown in FIGS. 20A and 20B.

The playback function can start actions such as addition of information, e.g., voice, image transfer using an electronic mail, and delete of an image, with a simple key operation without switching the modes with respect to an image immediately after it is photographed by a camera. This playback function will be described below with reference to the flow chart.

Referring to FIG. 21, in step S2101 the CPU 215 checks whether a new photographed image exists. A "new image" is a photographed image which is kept effective after a picture is taken by a shutter button operation and before another function such as mode switching is executed.

If no new image exists, in step S2110 the CPU 215 completes the return processing, i.e., the interrupt processing, returns the flow to the loop shown in FIG. 19, and resumes the image monitoring processing.

If a new image exists, processing steps similar to those from steps S1908 to S1911 in FIG. 19 are performed. First, in step S2102, the CPU 215 performs processing for correcting any shift of the aspect ratio caused by the difference between the processing frequencies for the new image written in the DRAM 220. In step S2103, the CPU 215 directs the NTSC encoder to convert the image into an NTSC signal. In step S2104, the CPU 215 outputs the NTSC signal to the LCD controller.

Upon receiving this output signal from the LCD controller, in step S2105 the EVF (color LCD 214) displays the new image.

Thereafter, in step S2106 the CPU 215 checks the type of playback function selected by the user and branches the flow to the corresponding playback processing. That is, if a voice addition function is selected, voice addition processing is executed in step S2107. If an image transfer function using an electronic mail is selected, mail transfer processing is executed in step S2108. If a photographed image delete function is selected, image delete processing is executed in step S2109.

<Acquisition of CS-ID Information>

On the basis of the information from the RTC 211, the sub CPU 216 issues a CS-ID information confirmation command to the PHS block 203 at a proper fixed interval such as one minute.

The PHS CPU 221 in the PHS block 203 receives this command, performs communication for obtaining CS-ID from a base station, and informs the sub CPU 216 of the obtained CS-ID information.

The sub CPU 216 transfers this information to the CPU 215. Following the same procedure as in the first embodiment, the CPU 215 compares the information with the CS-ID information already registered in the CS-ID information registration area of the flash ROM 213. If unregistered new CS-ID information is transferred from the sub CPU 216, the CPU 215 writes this CS-ID information together with the date and time at which the information is obtained in the CS-ID information registration area.

If the PHS CPU 221 cannot obtain CS-ID information, the CS-ID information sent from the PHS CPU 221 to the sub CPU 216 and the CS-ID information sent from the sub CPU 216 to the CPU 215 are blank.

If the CS-ID information transferred from the sub CPU 216 is the same as the CS-ID information already registered in the CS-ID information registration area, this CS-ID information is not written in the CS-ID information registration area.

These actions are performed at fixed time intervals. If the CS-ID information obtained by the sequence is changed, the history is stored together with the date/time of the change. Also, if the shutter switch 208 is depressed to complete photography (or immediately before photography), the acquisition of CS-ID information is immediately executed.

The acquisition interval of CS-ID information can be set from a menu by the user. Alternatively, CS-ID information can be obtained only in photography in order to save the consumption power for communication.

<Formation of Image Data File>

When a picture is taken by depressing the shutter switch 208, the CPU 215 JPEG-compresses the photographed image and stores the compressed image as a JFIF file including a thumbnail image described earlier in the flash ROM 213.

The CPU 215 reads out the CS-ID information and the date/time information already recorded in the flash ROM 213 and writes the readout information in an extension area for storing image property information.

For the first image after the power switch is turned on, data corresponding to the moving history of the image input apparatus is recorded. It is of course possible to record only CS-ID information during photography or not to record any information.

Note that CS-ID can be converted into information indicating the name of a specific location or can be stored as intermediate code information in the image property information area. Neither case impair the effect of the present invention.

Figure 22:
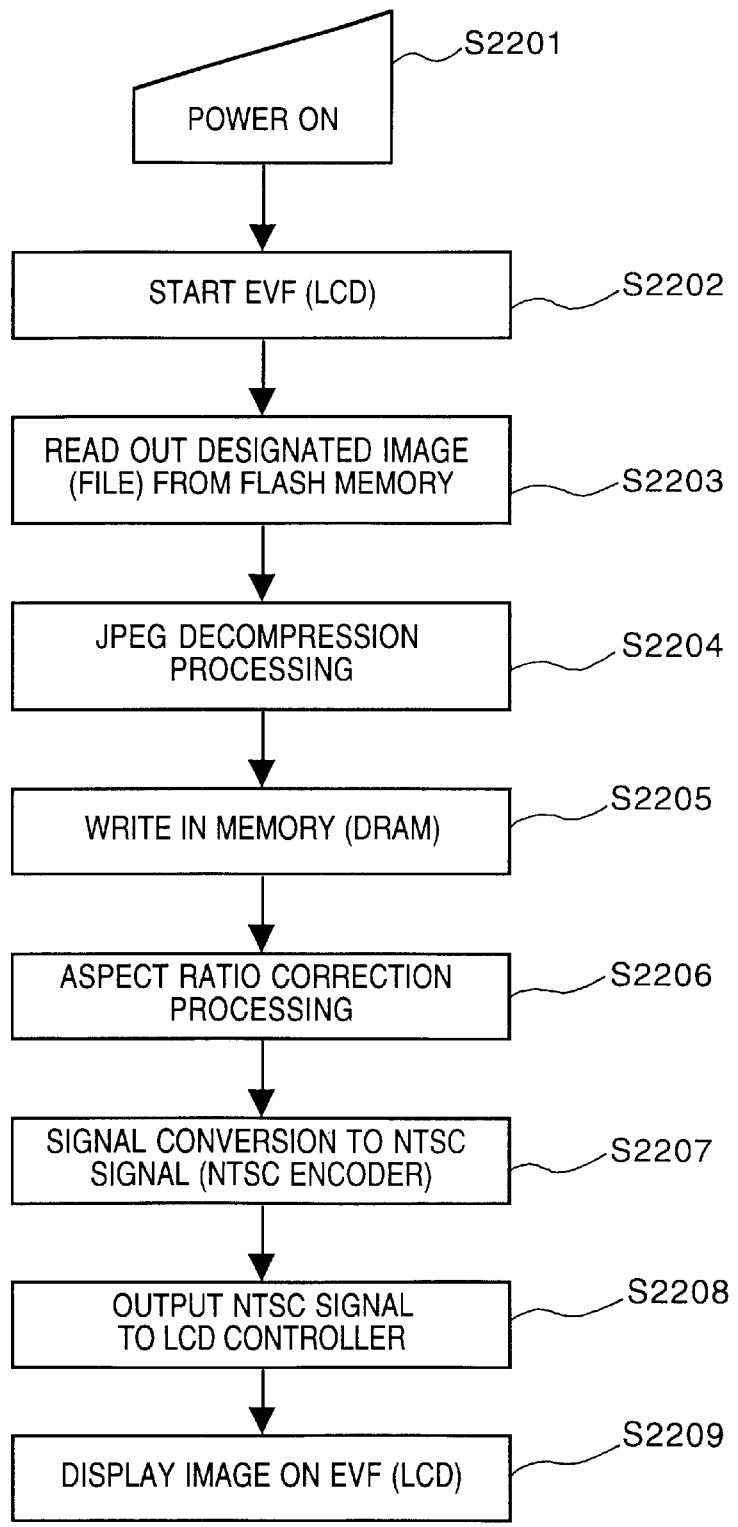
FIG. 22 is a flow chart showing the control procedure when a photographed image is reproduced in the fourth embodiment of the present invention.

FIG. 22 is a flow chart showing the control procedure of reproducing (displaying) a photographed image in the VIEW mode.

In step S2201, the CPU 215 detects that the power switch is turned on or the mode is switched to the VIEW mode. In step S2202, the CPU 215 starts the operation of the electronic view finder (EVF (color LCD 214)) for checking an object during photography.

In step S2203, the CPU 215 reads out the compressed image data, written in step S2021 of FIG. 20A (photographing operation), from the flash ROM 213. In step S2204, the CPU 215 executes image decompression processing, i.e., processing for converting the compressed data based on the JPEG standard into original data (YCrCb). In step S2205, the CPU 215 writes the decompressed original data into the memory (DRAM 220).

Thereafter, as in the processing steps from S1908 to S1911 in FIG. 19, in step S2206 the CPU 215 performs processing for correcting any shift of the aspect ratio caused by the difference between the processing frequencies for the written image data. In step S2207, the data is converted into an NTSC signal by the NTSC encoder. In step S2208, the NTSC signal is output to the LCD controller.

Upon receiving this output signal from the LCD controller, in step S2209 the EVF (color LCD 214) displays the designated selected image.

To display a photographed image, the CPU 215 refers to the extension marker in the JFIF extension area and displays a text based on data such as the CS-ID information and the date, together with the thumbnail image, on the LCD.

The CS-ID information is displayed as rough information of the photographing date and location together with the image by converting practical addresses (e.g., Shimomaruko 1-chome, Ohta Ward, Tokyo; Shimomaruko 2-chome, Ohta Ward, Tokyo; and Fukayacho, Totsuka Ward, Yokohama City) of the data and the base station.

Alternatively, a list of photographing dates/times and photographing locations is displayed to prompt the operator to choose.

The number of files which can be displayed on one screen is larger in a display of a list than in a display containing thumbnail images. Therefore, a display of a list is more preferable as the first select screen.

Also, lists can be selectively used in accordance with the purpose of search if both the order of date/time and the order of location can be switched.

By using this function, the moving state on a given day can also be displayed.

That is, when the mode in which CS-ID information is stored together with a date/time whenever information is changed is set as in this embodiment, the movement of the image input apparatus can be clearly seen by overlaying the moving path of photographing locations on map information. Accordingly, the user can easily recall how he or she moved to take pictures.

Also, when moving images are photographed, the movement during the photography is known.

The locus of photography is further clarified by storing compass information of east, west, south, and north as the image property information in the extension area.

Additionally, in transmitting an image by communication, the CS-ID information on the sending side and the receiving side are stored in the image property area. Consequently, it is readily possible to confirm that the image is a received image and to confirm the sender, the sending position, and the receiving position of the image. If this is the case, discrimination information indicating that the information is different from photographing information is added before storage. Consequently, it is possible to easily discriminate between the photographing location and the communication location.

This discrimination information can also be used as search information. If a list is displayed as the search information, search can be performed from a larger amount of information.

Also, if CS-ID information in the image property area is stored as a scramble cipher, this CS-ID information cannot be altered. This improves the credibility as an evidence.

In this embodiment as described above, position information obtained when an image is photographed can be stored as property information of the photographed image. Accordingly, this position information can be displayed together with the image under simple control.

Also, in communicating the photographed image, the position information can be communicated as the property information.

Furthermore, the position information can be stored in the JFIF extension area of the JFIF image file format. This obviates the need for use of a special image file format for storing the position information.

Fifth Embodiment

Although the image file described above has an internal image property area, a flash ROM 213 already stores CS-ID information and its acquisition date/time. In this embodiment, therefore, the information storage area is related to the file of a photographed image.

That is, assume that the CS-ID information and the date information until photography are stored in addresses XX00 to XX06 of the flash ROM 213 by <acquisition of CS-ID information> explained in the fourth embodiment. When a photographed image data file is recorded in addresses FX00 to FX50 in this case, a CPU 215 relates these two address information to each other and stores them in an information management area. This area stores an image file name, an image data storage address, and an image property storage address (FIG. 24).

Thereafter, data is written in the information management area whenever a photographed image is added.

It is of course possible to write CS-ID information and addresses recording the acquisition date/time of the information in the extension area of the JFIF file.

In this embodiment as described above, position information stored together with images can be reduced.

Additionally, it is unnecessary to store the same position information in both of an area for storing position information until photography and an area for storing position information together with images.

Sixth Embodiment

In the fourth embodiment, photography of still images is taken as an example. However, CS-ID information can also be related to moving images.

To this end, 30 frames of information of an input image from a photoelectric conversion device 205 such as a CCD need only be compressed and stored per second while a shutter button is depressed.

Figure 25:
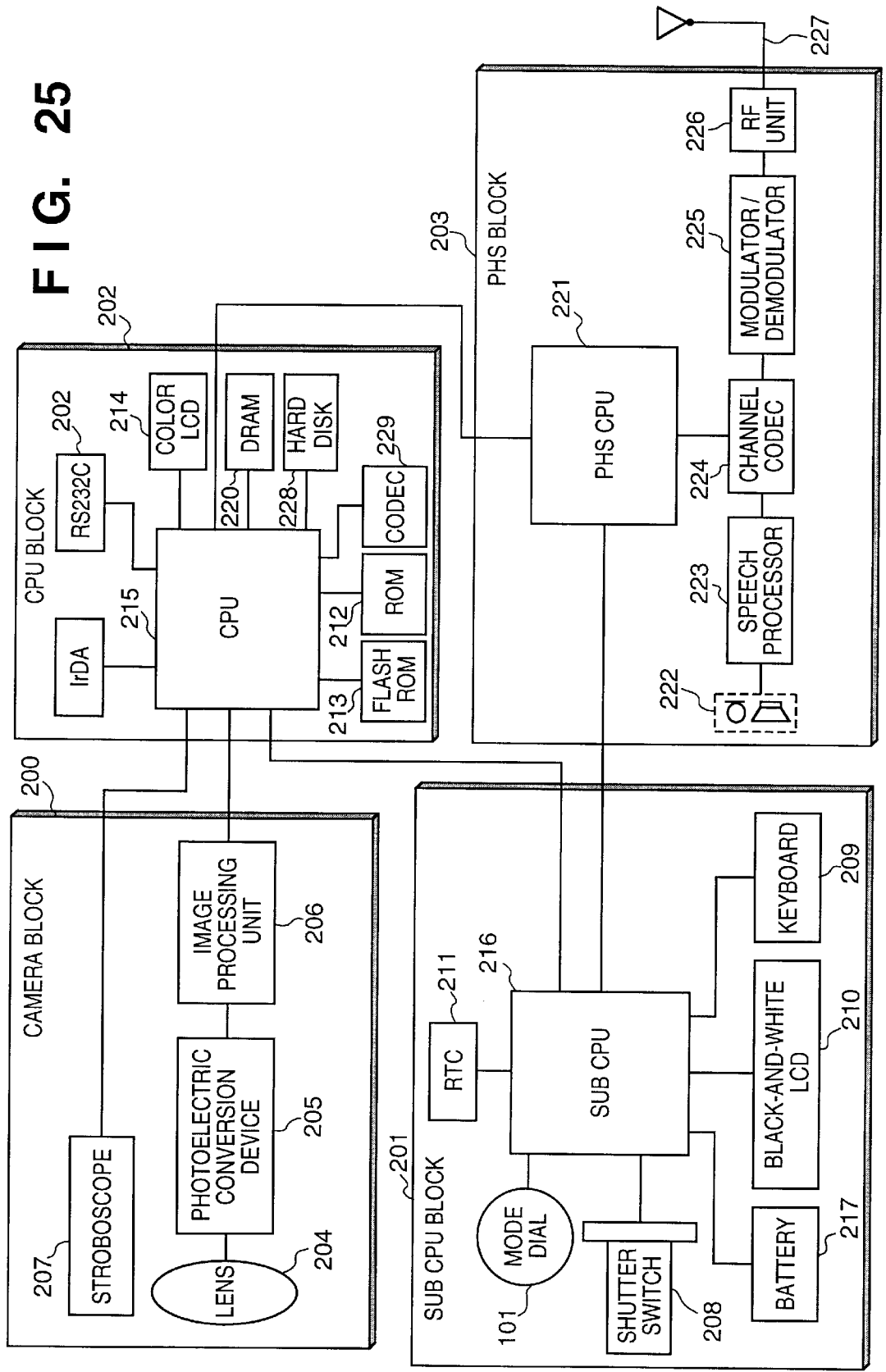
FIG. 25 is a block diagram of an image input apparatus according to the fifth embodiment of the present invention.

FIG. 25 is a block diagram of an image input apparatus of this embodiment.

A CPU block 202 incorporates a 2.5" hard disk 228 and can record a total of 30 minutes of moving images by using a CODEC 229 capable of known MPEG2 (Moving Picture Experts Group 2).

In this embodiment, CS-ID information is acquired at an interval of one minute from the start to the end of photography. The date/time information and the CS-ID information are recorded in a user extension area of each picture frame header of an MPEG2 image.

In reproduction, the moving state of the photographing apparatus can be displayed by using this CS-ID information.

This similarly applies to an apparatus using a tape instead of the hard disk 228.

In the case of the DVC format, for example, similar information is recorded in a data area in the leading portion of one track. Also, in a moving image apparatus using a semiconductor memory as a recording medium, CS-ID information and date/time information can be recorded in each frame, or another information management area can store data.

In this embodiment as described above, position information obtained from a base station can be added to moving images.

As many apparently widely different embodiments of the present invention can be made without departing from the spirit and scope thereof, it is to be understood that the invention is not limited to the specific embodiments thereof except as defined in the appended claims.

What is claimed is:

1. An image input apparatus comprising:
   image input means for inputting an image;
   identification information receiving means for receiving a plurality of identification information transmitted from a plurality of respective base stations for controlling a radio communication apparatus and used to identify each of said plurality of respective base stations;
   registering means for registering position information in relation to each of said plurality of identification information to identify each of said plurality of respective base stations; and
   control means for selecting position information from registration of said registering means based on each of said plurality of identification information received by said identification information receiving means, and storage means for storing the position information selected by said control means in relation to image data inputted by said image input means.

2. The apparatus according to claim 1, wherein said control means adds the position information to the input image data from said image input means when said information receiving means receives each of said plurality of identification information.

3. The apparatus according to claim 1, further comprising communication means for performing communication via each of said plurality of respective base stations.

4. The apparatus according to claim 3, wherein said communicating means transmits the data stored by said control means to each of said plurality of respective base stations.

5. The apparatus according to claim 3, wherein said communicating means has voice communicating means for performing voice communication.

6. The apparatus according to claim 5, wherein said voice communicating means and said image input means operate independently of each other.

7. The apparatus according to claim 5, wherein said voice communicating means is detachable.

8. The apparatus according to claim 5, wherein data transmission by said communicating means and voice communication by said voice communicating means can be freely switched.

9. The apparatus according to claim 1, wherein said control means performs control to store the position information as attribute information of the image data.

10. The apparatus according to claim 1, wherein said control means stores the image data by a JFIF (JPEG File Interchange Format) image file format.

11. The apparatus according to claim 10, wherein said control means performs control to store the position information in a property extension area of the JFIF image file format.

12. The apparatus according to claim 1, wherein said identification information receiving means receives said plurality of identification information from a base station of a cordless digital telephone.

13. The apparatus according to claim 3, wherein said communicating means performs communication via a base station of a cordless digital telephone.

14. An image input apparatus comprising:
   first communicating means for transmitting image data;
   second communicating means for performing voice communication;
   designating means for manually designating a start of a transmission of the image data by said first communication means or a voice communication by said second communicating means; and
   switching means for stopping a transmission of the image data by said first communicating means in response to a request for a start of a voice communication by said designating means while the image data is being transmitted by said first communicating means, and starting a voice communication by said second communication means to said destination.

15. The apparatus according to claim 14, wherein said switching means also switches the voice communication by said second communicating means to the transmission of the image data by said first communicating means, in accordance with the start of the transmission of the image data designated by said designating means while the voice communication is being performed by said second communicating means.

16. An image input apparatus comprising:
   first communicating means for wirelessly transmitting image data;
   second communicating means for performing wirelessly voice communication;
   designating means for designating a start of a transmission of the image data by said first communicating means or a voice communication by said second communicating means; and
   switching means for stopping a voice communication by said second communication means to a destination and starting a transmission of the image data by said first communicating means to said destination, when a start of a transmission of the image data is detected by said designating means while a voice communication is being perform by said second communicating means.

17. The apparatus according to claim 16, wherein said switching means also switches a transmission of the image data by said first communicating means to the voice communication by said second communicating means, in accordance with a start of a voice communication designated by said designating means while a transmission of the image data is being preformed by said first communicating means.

18. A method of controlling an image input apparatus, comprising:

an image input step of inputting an image;

an identification information receiving step of receiving a plurality of identification information transmitted from a plurality of respective base stations for controlling a radio communication apparatus and used to identify each of said plurality of respective base stations;

a registration step of registering position information in relation to each of plurality of identification information to identify each of said plurality of respective base stations in accordance with a registration operation by an operator; and a control step of selecting position information from registration generated in the registering step based on each of said plurality of identification information received in the identification information receiving step, and a storing step of storing the position information selected in said control step in relation to image data inputted in said image input step.

19. A method of controlling an image input apparatus, comprising:

a first communication step of transmitting image data;

a second communication step of performing voice communication;

a designation step of manually designating a start of a transmission of the image data in the first communication step or a voice communication in the second communication step; and a switching step of stopping a transmission of the image data in the first communicating step in response to a request for a start of a voice communication at said designating step while the image data is being transmitted in the first communication step, and starting a voice commuication at said second communication step to said destination.

20. A method of controlling an image input apparatus, comprising:

a first communication step of wirelessly transmitting the image data;

a second communication step of performing wirelessly voice communication;

a designation step of designating a start of a transmission of the image data in the first communication step or a voice communication in the second communication step; and a switching step of stopping a voice communication in the second communication step to a designation and starting a transmission of the image data in the first communicating step to said designation, when a start of a transmission of the image data is detected at said designating step while a voice communication is being performed in the second communication step.

21. A program storage device readable by a machine, tangibly embodying a program of instructions executable by the machine to perform method step for controlling an image input apparatus, said method steps comprising:

an image input step of inputting image data;

an identification information receiving step of receiving a plurality of identification information transmitted from a plurality of respective base stations for controlling a radio communication apparatus and used to identify each of said plurality of respective base stations;

a registration step of registering position information in relation to each of a plurality of identification information to identify each of said plurality of respective base stations in accordance with a registration operation by an operator;

a control step of selecting position information from registration generated in the registering step based on each of said plurality of identification information received in the identification information receiving step, and a storing step of storing the position information selected in said control step in relation to image data inputted in said image input step.

22. A program storage device readable by a machine, tangibly embodying a program of instructions executable by the machine to perform method step for controlling an image input apparatus, said method steps comprising:

a first communication step of transmitting the input image data;

a second communication step of performing voice communication;

a designation step of manually designating a start of a transmission of the image data in the first communication step or a voice communication in the second communication step; and a switching step of stopping a transmission of the image data in the first communicating step in response to a request for a start of voice communication at said designating step while the image data is being transmitted in the first communication step, and starting a voice communication at said second communication step to said designation.

23. A program storage device readable by a machine, tangibly embodying a program of instructions executable by the machine to perform method step for controlling an image input apparatus, said method steps comprising:

a first communication step of wirelessly transmitting the input image;

a second communication step of performing wirelessly voice communication;

a designation step of designating a start of a transmission of the image data in the first communication step or a voice communication in the second communication step; and a switching step of stopping a voice communication in the second communication step to a destination and starting a transmission of the image data in the first communicating step to said destination, when a start of a transmission of the image data is detected at said designating step while a voice communication is being performed in the second communication step.

24. A program storage device readable by a machine, tangibly embodying a program of instructions executable by the machine to perform method step for controlling an image input apparatus, said method steps comprising:

an image input step of inputting an image;

an identification information receiving step of receiving identification information transmitted from a base station for controlling a radio communication apparatus and used to identify said base station;

a storage step of storing information pertinent to the identification information received in the identification information receiving step in relation to image data;

a read step of reading out the image data stored in the storage step and the information pertinent to the identification information; and an output step of outputting the image data and the information pertinent to the identification information read out in the read step, wherein the output step outputs the image data in relation to the information pertinent to the identification information.

25. An image input apparatus comprising:

image input means for inputting an image;

identification information receiving means for receiving identification information transmitted from a base station for controlling a radio communication apparatus and used to identify said base station;

storage means for storing information pertinent to the identification information received by said identification information receiving means in relation to image data;

output means for reading out the image data stored by said storage means and the information pertinent to the identification information, and outputting the image data and the information pertinent to the identification information, wherein the output means outputs the image data in relation to the information pertinent to the identification information.

26. A method of controlling an image input apparatus comprising:

an image input step of inputting an image;

an identification information receiving step of receiving identification information transmitted from a base station for controlling a radio communication apparatus and used to identify said base station;

a storage step of storing information pertinent to the identification information received in the identification information receiving step in relation to image data;

an output step of reading out the image data stored in the storage step and the information pertinent to the identification information, and outputting the image data and the information pertinent to the identification information, wherein the image data are output in relation to the information pertinent to the identification information.

* * * * *

UNITED STATES PATENT AND TRADEMARK OFFICE
CERTIFICATE OF CORRECTION

PATENT NO.    : 6,564,070 B1
DATED         : May 13, 2003
INVENTOR(S)   : Kazuhide Nagamine et al.

It is certified that error appears in the above-identified patent and that said Letters Patent is hereby corrected as shown below:

<u>Column 8,</u>
Line 29, "(1110)." should read -- (S1110). --.

Signed and Sealed this

Fourth Day of November, 2003

JAMES E. ROGAN
*Director of the United States Patent and Trademark Office*